US012773694B2

(12) United States Patent
Hasty et al.

(10) Patent No.: US 12,773,694 B2
(45) Date of Patent: Oct. 27, 2026

(54) ELECTROCHEMICAL CELLULAR CIRCUITS

(71) Applicant: The Regents of the University of California, Oakland, CA (US)

(72) Inventors: Jeff Hasty, Encinitas, CA (US); Muhammad Omar Din, San Diego, CA (US); Aida Martin Galan, La Jolla, CA (US)

(73) Assignee: The Regents of the University of California

( * ) Notice: Subject to any disclaimer, the term of this patent is extended or adjusted under 35 U.S.C. 154(b) by 944 days.

(21) Appl. No.: 17/923,129

(22) PCT Filed: May 4, 2021

(86) PCT No.: PCT/US2021/030687
§ 371 (c)(1),
(2) Date: Nov. 3, 2022

(87) PCT Pub. No.: WO2021/226113
PCT Pub. Date: Nov. 11, 2021

(65) Prior Publication Data

US 2023/0294097 A1 Sep. 21, 2023

Related U.S. Application Data

(60) Provisional application No. 63/019,664, filed on May 4, 2020.

(51) Int. Cl.
*B01L 3/00* (2006.01)

(52) U.S. Cl.
CPC . *B01L 3/502761* (2013.01); *B01L 2200/0652* (2013.01); *B01L 2300/0645* (2013.01); *B01L 2300/0877* (2013.01)

(58) Field of Classification Search
CPC ....... B01L 3/502761; B01L 2200/0652; B01L 2300/0645; B01L 2300/0877; C12N 15/63
See application file for complete search history.

(56) References Cited

U.S. PATENT DOCUMENTS

| | | | |
|---|---|---|---|
| 6,529,835 | B1 | 3/2003 | Wada et al. |
| 2006/0223164 | A1 | 10/2006 | Orwar et al. |
| 2009/0197243 | A1 | 8/2009 | Rieder et al. |

(Continued)

OTHER PUBLICATIONS

Din et al., "Synchronized cycles of bacterial lysis for in vivo delivery," Nature, Aug. 4, 2016, 536(7614):81-85.

(Continued)

*Primary Examiner* — Brian J. Sines
(74) *Attorney, Agent, or Firm* — Fish & Richardson P.C.

(57) ABSTRACT

Disclosed herein is a method of measuring a cell population, the method including culturing a cell population in a growth medium, wherein the cell population includes a cell strain including a control gene and a promoter sequence; positioning first and second electrodes in contact with the growth medium, wherein the first and second electrodes are connected to different terminals of an electrical source; applying an electrical signal between the two electrodes; measuring an electrical parameter of the growth medium as a function of time; and determining information about the cell population based upon the measured electrical parameter.

19 Claims, 18 Drawing Sheets

(56) References Cited

U.S. PATENT DOCUMENTS

| | | | |
|---|---|---|---|
| 2014/0248621 A1* | 9/2014 | Collins ................ | C12N 5/0696 435/6.12 |
| 2015/0369771 A1 | 12/2015 | Richardson-Burns et al. | |
| 2016/0040173 A1 | 2/2016 | Yang et al. | |
| 2016/0167051 A1 | 6/2016 | Collins | |
| 2016/0319238 A1 | 11/2016 | Hsiao et al. | |
| 2018/0120231 A1 | 5/2018 | Wainwright et al. | |
| 2019/0024114 A1 | 1/2019 | Bauer et al. | |

OTHER PUBLICATIONS

International Preliminary Report on Patentability in International Appln. No. PCT/US2021/030687, mailed on Nov. 17, 2022, 15 pages.
International Search Report and Written Opinion in International Appln. No PCT/US2021/030687, mailed on Oct. 18, 2021, 19 pages.
Rols "Electropermeabilization, a physical method for the delivery of therapeutic molecules into cells," Biochimica et Biophysica Acta (BBA)—Biomembranes, Mar. 1, 2006, 1758(3):423-428.

* cited by examiner

ELECTROCHEMICAL CELLULAR CIRCUITS

CROSS-REFERENCE TO RELATED APPLICATIONS

This application is a National Stage Application under 35 U.S.C. § 371 and claims the benefit of International Application No. PCT/US2021/030687, filed May 4, 2021, which claims priority to U.S. Provisional Patent Application No. 63/019,664, filed on May 4, 2020, the entire contents of which are incorporated herein by reference.

FIELD OF THE DISCLOSURE

The disclosure relates to cellular circuitry and to the interface of cellular populations with electrical circuits and circuit elements.

BACKGROUND

Conventional sensing techniques for organic and inorganic substances include a variety of molecular recognition strategies in which biomolecules bind to, and function as reporters for, the substances. To ensure that substances are detecting using these techniques, binding events are accompanied by changes in detectable properties of the biomolecules. Examples of such properties include optical absorption and emission, solution conductivity, and mobility. Applying these techniques to monitor cellular population dynamics in genetic circuits presents a number of challenges that can make the techniques impractical.

SUMMARY

This disclosure features methods, devices, and systems in which genetic circuits that include cellular populations are integrated with electrical circuits. Direct electrical measurements of the cellular populations can be used to detect an analyte of interest (e.g., a target analyte), the concentration or amount of which can be used to assess cellular population dynamics.

Cells produce a number of metabolic products during regular cellular metabolic processes. As a population of cells grows in solution, the production and concentration of the metabolic products increases correspondingly. Conversely, as the population declines, the production and concentration of metabolic products declines. When a metabolic product is charged, the product can function as a charge carrier for electrical signals in the solution. Accordingly, conductive electrodes placed in a solution containing the cellular population and connected to an electrical source can be used to measure changes in one or more electrical parameters of the solution, such as impedance or admittance, or conductivity or resistance. Such measurements can be used to determine information about the cellular population in solution, as changes in the cellular population are correlated with changes in the concentrations of metabolic products in solution.

Cellular populations can be used as biological sensors for a variety of target analytes. Cellular strains from which the cellular population are composed can be genetically engineered to include at least one control gene that is responsive to a promoter sequence. The promoter sequence can bind to an inducer agent, which can be the target analyte or can bind the target analyte, and can regulate transcription of the control gene based upon the presence of the target analyte.

When the target agent is introduced into a solution containing the cellular population, the activated control gene can modify the metabolic output of the cellular population, increasing or decreasing the concentration of metabolic products in solution. For example, the control gene can cause the cellular population to lyse, thereby ceasing production of metabolic products. The change in metabolic product concentration modulates the electrical properties of the solution, and by measuring the electrical properties, the induced change in the cellular population—and therefore the presence of the target analyte—can be determined. Cellular strains that are used in the cellular populations can include more than one control gene, and more than one promoter. In some embodiments, multiple cellular strains are included in a cellular population that is used in a sensor.

Embodiments of the methods, devices, and systems described herein may provide one or more of the following advantages. First, the methods, devices, and systems can be used for long term molecular sensing. In a solution containing a target analyte, a cellular population that is also present in the solution can receive an ongoing supply of a growth medium. The cellular population can therefore survive and reproduce for long time periods, enabling the monitoring of the target analyte over long time periods. This can be advantageous in situations where the observation schedule for the target analyte is infrequent.

Second, some embodiments disclosed herein can utilize low volume sampling to produce a measureable signal change. Cellular populations can be contained in reservoirs (e.g., microfluidic wells) on a fluidic chip, and the wells can have relatively low volumes (e.g., less than 10 μL). This permits analyte detection using very low sample volumes.

Third, some embodiments disclosed herein can detect multiple analytes in multiplexed fashion. Multiple microwells on a fluidic chip can be in fluid connection with a supply channel, and each microwell can contain a cellular population that includes a different cellular strain responsive to a different target analyte. Detection of multiple target analytes in a single solution allows for multiplexed assays to be performed on a single fluidic chip.

Fourth, some embodiments disclosed herein operate as feedback circuits capable of determining the presence and quantity of a target analyte in solution. Cellular strains including two or more promoters coupled to corresponding control genes provide an oscillatory circuit capable of responding to the presence and level of an analyte. This aids in monitoring population mechanics over time in response to changing levels of target analyte and delivering near-real time measurements in situ.

Fifth, some embodiments disclosed herein implement small form-factor sensors for the detection of target analytes. Systems that include microwell arrays formed on fluidic chips can enable field detection of target analytes in a variety of environments and applications, including food analysis, agricultural production, and medical applications.

In general, in a first aspect, the disclosure includes a method of measuring a cell population, the method including culturing a cell population in a growth medium, wherein the cell population includes a cell strain including a control gene and a promoter sequence; positioning first and second electrodes in contact with the growth medium, wherein the first and second electrodes are connected to different terminals of an electrical source; applying an electrical signal between the two electrodes; measuring an electrical parameter of the growth medium as a function of time; and determining information about the cell population based upon the measured electrical parameter.

In some embodiments, the electrical parameter can include an electrical admittance of the growth medium. The electrical parameter can include an electrical impedance of the growth medium. The electrical parameter can include a conductance of the growth medium. The electrical parameter can include a resistance of the growth medium. Applying the electrical signal can include applying an electrical potential difference between the two electrodes. The cell population can include one or more different bacterial strains. The cell population can include one or more different yeast strains. The cell population can include one or more different mammalian cell strains. The cell population can include one or more different insect cell strains. The growth medium can be selected from the group consisting of a liquid medium and a solid medium. The solid medium can include a hydrogel. The solid medium can include at least one gel-based material.

In some embodiments, the method can further include maintaining the cell population in a chamber, and flowing the growth medium through the chamber. The method can further include measuring the electrical parameter in different portions of the flowing growth medium as a function of time. The control gene can be activated by at least one mechanism selected from the group consisting of: an external inducer; a self-activated inducer; and a combination of an external inducer and a self-activated inducer. The external inducer can be selected from the group consisting of: exposure to optical radiation, a change in temperature, a chemical reagent, a viral agent, and combinations thereof. Measuring the electrical parameter can include measuring at least member selected from the group consisting of: a cyclic voltammetry signal for the growth medium; a potentiometry signal for the growth medium; an electrical conductivity of the growth medium; a phase difference between electrical signals measured for the growth medium; and combinations thereof. The electrical signal can be an alternating current (AC) electrical signal. The electrical signal can be a direct current (DC) electrical signal. The control gene can be a single-gene lysis gene, a multi-gene lysis gene, one or more TA module genes, one or more toxin genes, or one or more peptide toxin gene. The control gene can be activated by a target analyte. The target analyte can include a chemical species. The target analyte can include a biochemical molecule.

In some embodiments, the method can further include determining a relative concentration of the target analyte in the growth medium as a function of time based on the information about the cell population. The information about the cell population can include information about a relative concentration of at least one metabolite generated by the cell population. Measuring the electrical parameter of the growth medium without introducing a redox active species into the growth medium.

In a second aspect, the disclosure includes a system for monitoring a cell population, the apparatus including: a reservoir configured to contain a cell population, wherein the cell population includes a cell strain including a control gene and a promoter sequence; electrodes configured to contact a growth medium in the reservoir; an electrical source connected to the electrodes and configured to apply an electrical signal to the growth medium; a detector configured to measure an electrical parameter of the growth medium as a function of time; and an electronic processor connected to the detector and configured to receive measurements of the electrical parameter, and to determine information about the cell population based on the measured electrical parameter.

In some embodiments, the reservoir can be formed in a microfluidic device. The reservoir can include an inlet and an outlet, and wherein the apparatus can include a fluidic device configured to transport the growth medium through the reservoir from the inlet to the outlet. The reservoir can include a recess configured to support a solid growth medium. The electrical parameter can include an electrical admittance of the growth medium. The electrical parameter can include an electrical impedance of the growth medium. The electrical parameter can include a conductance of the growth medium. The electrical parameter can include a resistance of the growth medium. Applying the electrical signal can include applying an electrical potential difference between the two electrodes. The cell population can include one or more different bacterial strains. The cell population can include one or more different yeast strains. The cell population can include one or more different mammalian cell strains. The cell population can include one or more different insect cell strains. The growth medium can be selected from the group consisting of a liquid medium and a solid medium. The solid medium can include a hydrogel. The solid medium can include at least one gel-based material. The cell population in a chamber, and flowing the growth medium through the chamber. The electrical parameter in different portions of the flowing growth medium as a function of time. The control gene can be activated by at least one mechanism selected from the group consisting of: an external inducer; a self-activated inducer; and a combination of an external inducer and a self-activated inducer. The external inducer can be selected from the group consisting of: exposure to optical radiation, a change in temperature, a chemical reagent, a viral agent, and combinations thereof. Measuring the electrical parameter can include measuring at least member selected from the group consisting of: a cyclic voltammetry signal for the growth medium; a potentiometry signal for the growth medium; an electrical conductivity of the growth medium; a phase difference between electrical signals measured for the growth medium; and combinations thereof. The electrical signal can be an alternating current (AC) electrical signal. The electrical signal can be a direct current (DC) electrical signal. The control gene can be a single-gene lysis gene, a multi-gene lysis gene, one or more TA module genes, one or more toxin genes, or one or more peptide toxin gene. The control gene can be a lysis gene. The control gene can be activated by a target analyte. The target analyte can include a chemical species. The target analyte can include a biochemical molecule.

The system can further include determining a relative concentration of the target analyte in the growth medium as a function of time based on the information about the cell population. The information about the cell population can include information about a relative concentration of at least one metabolite generated by the cell population. The apparatus can further include measuring the electrical parameter of the growth medium without introducing a redox active species into the growth medium.

In a third aspect, the disclosure includes a method for determining a presence of a target analyte in a medium, the method including: culturing a cell population a medium, wherein: the cell population includes a cell strain including a control gene and a promoter sequence; the promoter sequence can be configured to bind a target analyte and, upon binding the target analyte, to activate the control gene to be expressed; and the control gene can be configured to modulate growth of the cell population; introducing the target analyte into the medium; measuring a change in an electrical parameter of the medium arising from a change in a concentration of a metabolite generated by the cell population following introduction of the target analyte; and identifying a presence of the target analyte in the medium based on the measured change in the electrical parameter.

In some embodiments, the target analyte can be a protein, oligonucleotide, or chemical compound. The chemical compound can be a metal-containing chemical compound. The electrical parameter can include an electrical admittance of the growth medium. The electrical parameter can include an electrical impedance of the growth medium. The electrical parameter can include a conductance of the growth medium. The electrical parameter can include a resistance of the growth medium. Applying the electrical signal can include applying an electrical potential difference between the two electrodes. The cell population can include one or more different bacterial strains. The cell population can include one or more different yeast strains. The cell population can include one or more different mammalian cell strains. The cell population can include one or more different insect cell strains. The growth medium can be selected from the group consisting of a liquid medium and a solid medium. The solid medium can include a hydrogel. The solid medium can include at least one gel-based material.

The method can further include maintaining the cell population in a chamber, and flowing the growth medium through the chamber. The method can further include measuring the electrical parameter in different portions of the flowing growth medium as a function of time. The control gene can be activated by at least one mechanism selected from the group consisting of: an external inducer; a self-activated inducer; and a combination of an external inducer and a self-activated inducer. The external inducer can be selected from the group consisting of: exposure to optical radiation, a change in temperature, a chemical reagent, a viral agent, and combinations thereof. Measuring the electrical parameter can include measuring at least member selected from the group consisting of: a cyclic voltammetry signal for the growth medium; a potentiometry signal for the growth medium; an electrical conductivity of the growth medium; a phase difference between electrical signals measured for the growth medium; and combinations thereof. The electrical signal can be an alternating current (AC) electrical signal. The electrical signal can be a direct current (DC) electrical signal. The control gene can be a single-gene lysis gene, a multi-gene lysis gene, one or more TA module genes, one or more toxin genes, or one or more peptide toxin gene. The control gene can be a lysis gene. The control gene can be activated by a target analyte. The target analyte can include a chemical species. The target analyte can include a biochemical molecule.

The method can further include determining a relative concentration of the target analyte in the growth medium as a function of time based on the information about the cell population. The information about the cell population can include information about a relative concentration of at least one metabolite generated by the cell population. The method can further include measuring the electrical parameter of the growth medium without introducing a redox active species into the growth medium.

In a fourth aspect, the disclosure includes a device for detecting a target analyte, the device including: a substrate including a reservoir configured to contain a cell population, wherein: the cell population includes a cell strain including a control gene and a promoter sequence; the promoter sequence can be configured to bind a target analyte and, upon binding the target analyte, to activate the control gene to be expressed; and the control gene can be configured to modulate growth of the cell population; an inlet formed on or in the substrate and connected to the reservoir; a fluid delivery mechanism connected to the inlet and configured to introduce the target analyte into the reservoir; electrodes configured to contact a medium supporting the cell population in the reservoir; an electrical source connected to the electrodes and configured to apply an electrical signal to the medium; a detector configured to measure an electrical parameter of the medium arising from a change in a concentration of a metabolite generated by the cell population following introduction of the target analyte; and an electronic processor connected to the detector and configured to receive measurements of the electrical parameter, and to identify the target analyte based on the measured change in the electrical parameter.

In some embodiments, the electrical parameter can include an electrical admittance of the growth medium. The electrical parameter can include an electrical impedance of the growth medium. The electrical parameter can include a conductance of the growth medium. The electrical parameter can include a resistance of the growth medium. The electrical signal can include applying an electrical potential difference between the two electrodes. The cell population can include one or more different bacterial strains. The cell population can include one or more different yeast strains. The cell population can include one or more different mammalian cell strains. The cell population can include one or more different insect cell strains. The growth medium can be selected from the group consisting of a liquid medium and a solid medium. The solid medium can include a hydrogel. The solid medium can include at least one gel-based material.

The device can further include maintaining the cell population in a chamber, and flowing the growth medium through the chamber. The device can further include measuring the electrical parameter in different portions of the flowing growth medium as a function of time. The control gene can be activated by at least one mechanism selected from the group consisting of: an external inducer; a self-activated inducer; and a combination of an external inducer and a self-activated inducer. The external inducer can be selected from the group consisting of: exposure to optical radiation, a change in temperature, a chemical reagent, a viral agent, and combinations thereof. Measuring the electrical parameter can include measuring at least member selected from the group consisting of a cyclic voltammetry signal for the growth medium; a potentiometry signal for the growth medium; an electrical conductivity of the growth medium; a phase difference between electrical signals measured for the growth medium; and combinations thereof. The electrical signal can be an alternating current (AC) electrical signal. The electrical signal can be a direct current (DC) electrical signal. The control gene can be a single-gene lysis gene, a multi-gene lysis gene, one or more TA module genes, one or more toxin genes, or one or more peptide toxin gene. The control gene can be a lysis gene. The control gene can be activated by a target analyte. The target analyte can include a chemical species. The target analyte can include a biochemical molecule.

The device can further include determining a relative concentration of the target analyte in the growth medium as a function of time based on the information about the cell population. The information about the cell population can include information about a relative concentration of at least one metabolite generated by the cell population. The device can further include measuring the electrical parameter of the growth medium without introducing a redox active species into the growth medium. The reservoir can be formed in a microfluidic device. The reservoir can include an inlet and an outlet, and wherein the apparatus can include a fluidic device configured to transport the growth medium through the reservoir from the inlet to the outlet. The reservoir can include a recess configured to support a solid growth medium.

Embodiments of the methods, systems, and devices described herein can include any one or more of the foregoing features, and any of the other features described, and can generally include combinations of multiple features, including features that are individually described in connection with different embodiments, in any combination except as expressly stated otherwise herein.

The term "population dynamics" as used herein refers to the temporal evolution of a cellular population as a dynamical system, and includes increases, decreases, and steady-state population numbers and the biological and environmental processes driving changes in population numbers such as, but not limited to, cellular replication and lysis rates.

The term "multiplex" as used herein refers a type of assay in which information about multiple analytes is obtained in the assay. The information about the multiple analytes can be obtained simultaneously, sequentially, or a combination of simultaneously and sequentially (i.e., certain analyte information can be obtained simultaneously, while information about other analytes is obtained sequentially). For example, a multiplex assay can include the detection or quantification of two or more (e.g., three or more, four or more, five or more, six or more, eight or more, ten or more, 15 or more, 20 or more, or even more) analytes in a single experiment.

The term "control gene" as used herein refers to a sequence of nucleotides which, when expressed through transcription and translation, modifies the metabolic process of the cellular populations. The metabolic process can be increased or decreased. For example, a control gene, when expressed, can produce a product which causes the host cell to lyse, thereby ceasing metabolic output.

The terms "promoter" and "promoter sequence" as used herein are synonymous, and refer to a sequence of nucleotides that directs the level of transcription of a given gene, e.g., the control gene. A promoter may be induced in response to changes in an inducer agent (e.g., in an inducer agent concentration) which activates transcription of the control gene.

The term "cellular integrated circuit" as used herein refers to a device which integrates electrical circuitry components measuring an electric parameter of a solution containing a cellular population capable of responding to the concentration of an inducer agent. For example, a cellular integrated circuit can include electrodes, a cellular population, and a growth medium providing nutrients to the cellular population.

The term "inducer agent" as used herein refers to a stimulus which functions to interact with the promoter sequence and activate transcription of the control gene. Inducer agents can include, by way of example, chemical inducer agents, temperature-sensitive inducer agents, and light-sensitive inducer agents, including intermediary mediation elements such as protein co-factors.

The term "redox active species" as used herein refers to a chemical species which undergoes a reduction reaction with a metabolite product in solution thereby gaining one or more electrons. The redox active species then acts as an intermediary charge carrier for coupled electronic systems and propagates electronic signals facilitating the indirect detection of the metabolite product, wherein increases or decreases in metabolite product concentrations are coupled to the increases or decreases in the concentration of redox active species, respectively.

The term "genetic circuit" as used herein refers to one or more cellular populations including genetic modification which facilitate the cellular population performing logical functions mimicking those observed in electronic circuits. For example, a combination of promoter sequences and control genes can be designed as a genetic circuit to inducing a specific cellular process, protein production, or adding a measurable element to the host cell or solution in response to a stimulus.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

BRIEF DESCRIPTION OF THE DRAWINGS

Like reference symbols in the various drawings indicate like elements.

DETAILED DESCRIPTION

Figure 1:
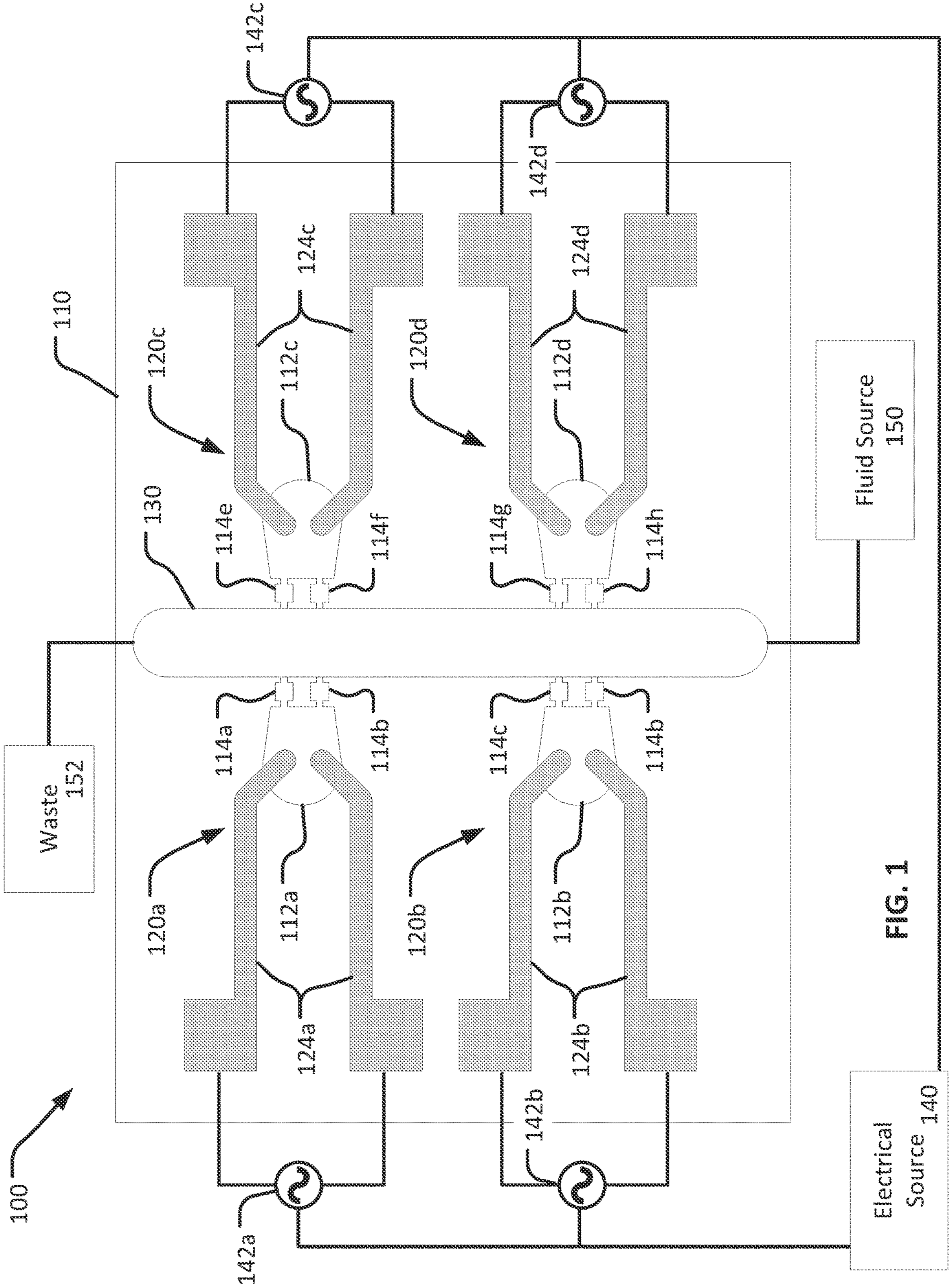
FIG. 1 is a schematic illustration of an array of microwells in a cellular integrated circuit.

A wide variety of biological molecules have been applied to the detection and quantification of analytes ex vivo using various detection methodologies. For example, biological molecules that selectively bind certain analytes and generate signals and/or can be isolated from complex environments are routinely used for such measurements. Such biological molecules have even be interfaced with microelectronic devices to yield compact, low-power sensing technologies that can be deployed in a variety of environments. Among other factors, devices based on these biological molecules can be limited to applications where the biological molecules do not saturate (i.e., the amount of analyte does not exceed the available concentration of biological molecules that bind them). Further, making quantitative measurements may involve interfacing the biological molecules with multiple components, yielding relatively complex devices and systems.

As an alternative, in synthetic biology, detection methods based on genetic expression can be used to characterize genetic circuit behavior and detect target analytes. Detectable signals generated by cellular populations have conventionally been generated through the addition of one or more redox active species. Redox active species are reagents that are added to a solution or suspension containing a cellular population. The redox state of the redox active species is modified by a cellular metabolite generated by the cellular population, resulting in a change in the electrical properties of the growth medium containing the cellular population. The change in electrical properties due to the perturbation of the redox state of the redox active species is then detected.

However, it has been discovered that metabolites and other species generated by cellular populations also directly affect the electrical properties of the solution, suspension, or other medium containing the cellular populations. As a result, concentrations of the metabolites and other species can be determined by measuring one or more electrical parameters of the medium directly, without adding redox active species into the medium.

To make such measurements, cellular populations are interfaced with electronic components and devices to form cellular integrated circuits. The interface between a cellular population and an electrical device can be implemented in various ways. For example, as will be described in further detail below, the interface is implemented by immersion of a pair of electrodes (e.g., containing a relatively inert, conductive material such as gold and/or platinum) in medium containing the active cellular population. By applying an electrical potential between the electrodes, one or more electrical parameters associated with the medium can be measured. Changes in the one or more electrical parameters as a function of time reflect changes in the cellular population. If the cellular population is responsive to a particular stimulus (e.g., a target analyte), then changes in the one or more electrical parameters can correlate with, and provide information about, the presence and concentration of the target analyte as a function of time. A variety of different electrical parameters of the medium can be measured, including (but not limited to), electrical admittance, impedance, conductivity, resistance, and relative phases between different parameter values.

Disclosed herein are cellular integrated circuits in which a cellular population is integrated with electrical devices and/or components to form the cellular integrated circuits. Typically, the cellular populations include one or more genetically engineered bacterial strains, although the cellular populations may also include only naturally occurring bacterial cell strains. As the population of cells reproduces, the production and concentration of charged metabolic products increases correspondingly in the medium supporting the population. Conductive electrodes are placed in contact with the solution containing the cellular population and an electrical source applies a potential between the electrodes. A detector connected to the electrodes determines a value of at least one electrical parameter of the medium containing the cellular population. As concentration of charged metabolic products increases, the value of the at least one electrical parameter varies correspondingly. Measured values of the one or more electrical parameters provide an indirect measurement of the cellular population.

In some of the methods, devices, and systems described herein, cellular populations include one or more bacterial strains that are specifically engineered to respond to a target analyte, a signal, or some other stimulus of interest. In response to the stimulus, the engineered bacteria may multiply, undergo cell death, or provide another type of response. During multiplication, production of certain cellular metabolic products increases and therefore the concentrations of those products in the medium increases as a function of time. Conversely, during population reduction via cell death, production of certain cellular metabolic products decreases, and the concentrations of those products in the medium decreases as a function of time. As noted above, it has been discovered that the perturbative effect of the changing concentrations of cellular metabolic products on the medium containing the cellular population is manifest as changes in one or more electrical parameters of the medium. These changes can be measured due to the interface between the cellular populations and electrical devices such as a detector, and the measurement information is used to determine information about the presence, absence, and magnitude of the stimulus. Such measurements can be performed to detect the perturbative effect of the metabolic products directly, without addition of a redox active species.

FIG. 1 is a schematic illustration showing a micro-fluidic chip 100 having four cellular integrated circuits 120*a-d* integrated on a substrate, which can be a wafer 110. The wafer 110 can be manufactured to include cellular integrated circuits 120 in a range from one to 24 (e.g., from two to 20, from 4 to 16, or from 8 to 12). Increasing the number of cellular integrated circuits 120 on a wafer 110 increases the degree to which the cellular integrated circuits 120*a-d* can be multiplexed, e.g., run in parallel. The cellular integrated circuits 120*a-d* are shown connected to a single channel 130, though in alternative embodiments, the cellular integrated circuits 120*a-d* can be connected to one or more channels in different arrangements. For example, in some embodiments, each cellular integrated circuit can be connected to a different channel.

Each cellular integrated circuit 120*a-d* includes a reservoir for containing a cell population, implemented as a micro-well 112*a-d*, and an electrode pair 124*a-d* in electrical communication with an electrical source 140 which provides an electrical signal 142*a-d*. Each micro-well 112 includes two chambers 114*a-h* in fluid connection with a channel 130. A fluid source 150 provides a fluid to the channel 130 which transmits the fluid to the connecting chambers 114*a-h* of each micro-well 112*a-d*. The upstream chamber of each micro-well, e.g., the chamber nearest the fluid source 150, provides a fluid inlet into the connected micro-well 112*a-d* while the chambers furthest from the fluid source 150 provides an outlet. Fluid flowing into the upstream inlet chamber displaces fluid within the microwell, which exits through the downstream chamber, thereby exchanging fluid volumes within the micro-wells 112*a-d*. The micro-wells 112*a-d* function as growth chambers for cellular populations that are present. The cellular populations can be seeded into the micro-wells 112*a-d* before the channel 130 is connected to the fluid source 150, or the fluid source 150 can provide a fluid containing one or more cellular populations to seed the micro-wells 112*a-d*.

The dimensions of the channel 130 are defined by the overall dimensions of the wafer 110 and orientations of the micro-wells 112*a-d*, but in general has a width in a range from 50 μm to 500 μm, for example 200 μm. The length of the channel 130 extends across portion of the wafer 110 and fluidly connects all the chambers 114*a-h* of the micro-wells 112*a-d*. In general the channel 130 length is in a range from 1000 μm to 5000 μm, for example, 2000 μm. Longer channel 130 dimensions can provide fluid to higher numbers of cellular integrated circuits 120 present on the micro-fluidic chip 100.

The micro-fluidic chip 100 includes a substantially transparent (e.g., optical transmission >95%) wafer 110 onto which the cellular integrated circuits 120 are constructed. The wafer 110 is a rigid unitary body which provides a stable platform for the construction of multiple cellular integrated circuits 120. The wafer 110 is composed of a chemically- and biologically inert solid medium material such as glass, quartz, or rigid polymer (e.g., polymethyl methacrylate (PMMA), or polydimethylsiloxane (PDMS)) which supports the construction of the cellular integrated circuits 120 and electrode pairs 124 onto the wafer 110. In some embodiments, the wafer 110 is composed, partially or completely, of a gel-based substrate, e.g., a hydrogel, and other structures including micro-wells 112*a-d*, chambers 114*a-h*, and channel 130 can be formed in the gel-based material.

The cellular integrated circuits 120 are formed on or in wafer 110 through one or more manufacturing methods. As an example, the wafer 110 can be additively manufactured (e.g., 3D printed, or resin cast/molded), or subtraction manufactured (e.g., lithography) to include the micro-wells 112*a-d* and channel 130. For example, described further herein, the wafer 110 can be resin molded from a master wafer (e.g., silicon or glass) using polydimethylsiloxane (PDMS). The master wafer can be photo-lithographically etched to create a negative master of the molded features of the wafer 110, including the channel 130, chambers 114*a-h*, and micro-wells 112*a-d*. A liquid resin (e.g., PDMS) is flowed over the master, cured, and removed to create the wafer 110. The dimensions of the molded features are etched into the master wafer which sets the dimensions for wafers 110 constructed from the master. The molded feature dimensions can be the same across the micro-wells 112*a-d* of a micro-fluidic chip 100, or the micro-wells 112*a-d* can have different dimensions between elements.

Each cellular integrated circuit 120 includes an electrode pair 124*a-d* (e.g., two electrodes). For examples, each cellular integrated 120*a*, 120*b*, 120*c*, and 120*d*, includes electrode pair 124*a*, 124*b*, 124*c*, and 124*d*, respectively. In some embodiments, to facilitate fabrication, the electrode pairs 124 are constructed onto the upper surface of the wafer 110 such that a first end of each of the electrode pairs 124 is positioned within one of the micro-wells 112*a-d*. In some embodiments, the electrode pairs 124 are deposited using masked lithography. As an example, the wafer 110 upper surface can be coated in one or more layers of a conductive material via a deposition method, such as spin coating, sputter deposition, or vapor deposition. The conductive material which composes the electrode pairs 124 can be a pure or alloyed material consisting of gold, silver, platinum, chromium, or other conductive, biosafe material. A portion of the deposited layers are removed whereby the electrode pairs 124 remain on the wafer 110 upper surface. In some embodiments, the portion of the deposited layers can be removed via lithographic surface patterning, electrochemical etching, or dry etching.

As an example, a photoresist layer is deposited on top of the deposited layers and exposed to a masked light pattern corresponding with the shape of the electrode pairs 124 (e.g., negative photoresist etching) to cure the un-masked photoresist layer. Alternatively, the masked light pattern corresponds with the portion of the deposited layer corresponding with the area surrounding the electrode pairs 124 (e.g., positive photoresist etching). The wafer 110 is then exposed to a developer (e.g., solvent) to remove the un-cured photoresist layer and expose the deposited conductive layer beneath. The exposed conductive layer is chemically etched to remove unwanted material from the layer and leave the electrode pairs 124.

The electrode pairs 124 provide an electrical connection for each of the cellular integrated circuits 120 to the electrical source 140. The electrical source 140 includes a power source (e.g., a battery), or alternatively, a means of connecting to a power source (e.g., a wall outlet) and circuitry to produce one or more electrical signals 142 to electrically connected cellular integrated circuits 120.

In general, the electrical source 140 applies an electrical potential difference between the electrodes of each cellular integrated circuit. In some embodiments, the electrical source 140 is an electronic hardware device that is configured to operate as a potentiostat for each connected electrode pair 124, such that the electrical source 140 provides a constant or variable electrical potential to one electrode of an electrode pair 124*a-d* which acts as a working electrode (WE). In certain embodiments, the electrical source 140 maintains the second electrode at a constant electrical potential such as, for example, a neutral (or grounded) electrical potential. As such, the second electrode functions as a reference/counter electrode (R/CE). In some embodiments, the electrical source 140 adjusts the current supplied to the WE to maintain the constant potential between the electrode pairs 124.

In certain embodiments, the electrical source 140 additionally includes circuitry to monitor one or more electrical parameters of the cellular integrated circuits 120. For example, the electrical source 140 determines a conductivity parameter of the fluid within the micro-wells 112*a-d* by monitoring the current needed to maintain the constant potential and calculating a conductivity parameter of the fluid in the micro-wells 112*a-d* providing the electrical connection between the electrode pairs 124. In some embodiments, the electrical source 140 includes circuitry which measures an electrical potential difference (e.g., a potentiometer), electrical current (e.g., ammeter), electrical impedance, electrical admittance, electrical conductance, electrical resistance, a phase difference between two electrical signals or between an electrical signal and a reference signal, and combinations of any of the foregoing.

Without wishing to be bound by theory, the impedance of an electric circuit is related to an effective resistance of the circuit to alternating current (AC) flow, arising from the combined effects of ohmic resistance and reactance, and is the measure of the opposition that a circuit presents to a current when a voltage is applied. When a cellular population is in a homeostatic growth phase within the micro-wells 112*a-d*, the concentration of metabolic products remains constant based on the metabolic products produced by the cellular population and the fluid exchanged with (e.g., flowing in and out of) the chambers 114*a-h*. The electrical source 140 can apply constant current to the R/CE to maintain a constant potential at the WE. Changes in the cellular population change the concentration of metabolic products within the micro-wells 112*a-d* and thereby the current needed to maintain the constant WE potential. The electrical source 140 can calculate the conductivity of growth medium (e.g., the fluid flowing in and out of the chambers) and determine any one or more of the parameters described above based upon the change in the current.

For example, as shown in FIG. 1, the electrical source 140 applies electrical signal 142*a* to electrode pair 124*a*, electrical signal 142*b* to electrode pair 124*b*, electrical signal 142*c* to electrode pair 124*c*, and electrical signal 142*d* to electrode pair 124*d*. In some embodiments, the electrical signals 142 are common (e.g., the same) between electrode pairs 124, and in alternative embodiments, the electrical source 140 applies more than one electrical signals 142 to the electrode pairs 124. By way of example, the electrical source 140 applies a first electrical signal 142*a* to integrated circuit 120*a*, and a second electrical signals 142 to integrated circuit 120*b*, 120*c*, and 120*d*. As described above the electrical signals 142 include applying a moderated current applied to the R/CE to maintain a constant potential at the WE. In alternative embodiments, the electrical signals 142 can include a constant current signal, a varying current signal, a varying voltage signal, or combinations thereof.

A fluid source 150 is in fluid connection with a first end of the channel 130. The fluid source 150 provides a fluid at a positive pressure to the channel 130 and connected micro-wells 112*a-d*. The fluid is a medium containing chemicals, and/or nutrients for sustaining the growth and activity of the cellular populations within the micro-wells 112*a-d*, such as culture media, minimal media, selective media, differential media, transport media, or indicator media. In some embodiments, the fluid can optionally include a buffer, solution, suspension, or mixture. For example, the fluid can be an LB media (Miller) and can be mixed with additional adjuncts to support the growth of the cellular populations. Alternative examples of media include general culture media, such as M9 medium, EZ Rich, or MacConkey medium. The fluid source 150 provides the fluid at a flow rate to the first end of the channel 130 by a positive pressure mechanism such as a pump, or gravity feed. For example, in some embodiments, the fluid source 150 is a peristaltic pump, such as a P625/10K. 143 peristaltic pump manufactured by Instech. A removable lid provides the inlet and outlet ports and fluid connections for the wafer 110.

The channel 130 and connected micro-wells 112*a-d* have low respective volumes and the flow rate through the channel 130 is correspondingly low. The channel 130 receives fluid from the fluid source 150 at a rate in a range from 1 μL/min to 75 μL/min (e.g., 5 μL/min to 60 μL/min, 10 μL/min to 40 μL/min, or 20 μL/min to 30 μL/min). In some embodiments, the channel 130 receives fluid from the fluid source 150 at a flow rate of 25 μL/min.

The fluid flows from the first end through the length of the channel 130 and exchanges fluid with the connected micro-wells 112*a-d*. The fluid flowing through the chambers 114*a-h* and being exchanged with the fluid within the micro-wells 112*a-d* provides growth materials for the cellular populations therein. Cellular waste products are removed from the micro-wells 112*a-d* during the exchange which flows through the chambers 114*a-h* and into the channel 130. The pressure and fluid flow provided by the fluid source 150 drive the excess material to the waste vessel 152.

Figure 2A:
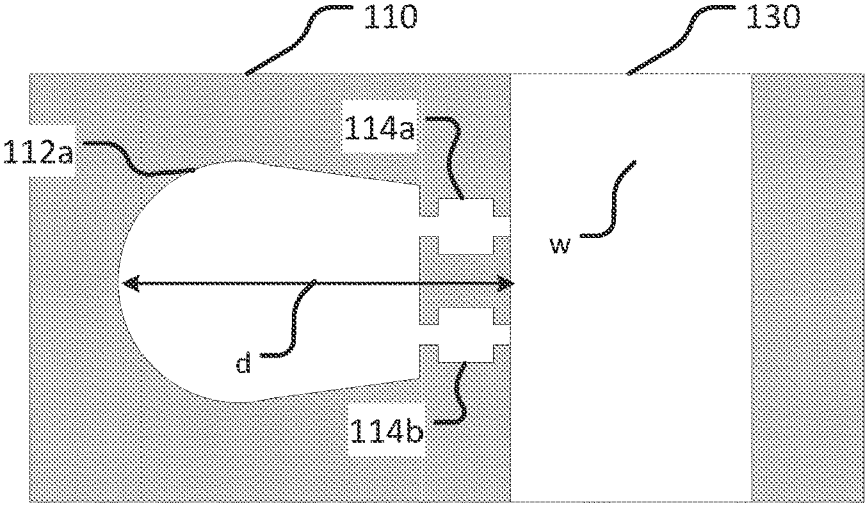
FIGS. 2A through 2C are schematic illustrations of a microwell in a cellular integrated circuit.
Figure 2B:
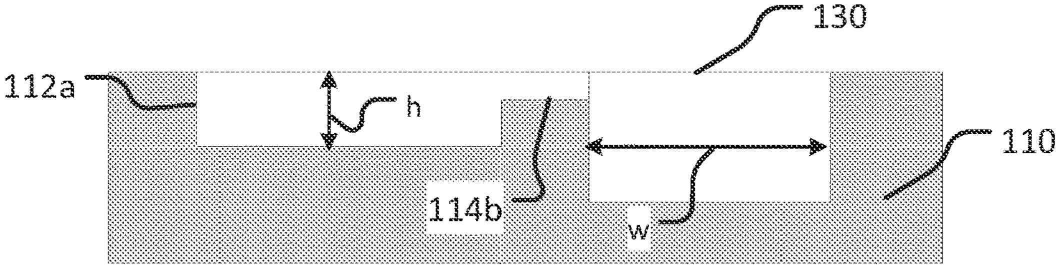

Referring now to FIGS. 2A and 2B, top-down and transverse cross-section views are shown, respectively, of a portion of the wafer 110 including micro-well 112*a*, chamber 114*a*, chamber 114*b*, and the portion of channel 130 in fluid connection with chambers 114*a* and 114*b*. The micro-wells 112*a-d* are approximately cylindrical with a diameter, d, of 600 μm and a height, h, of 30 μm. The diameter, d, can be in a range from 100 μm to 1000 μm (e.g., 200 μm, 250 μm, 300 μm, 500 μm, 700 μm, or 900 μm). Smaller diameters facilitate lower pitch distances and higher micro-well 112*a-d* density on a wafer 110. The micro-well 112*a* height, h, can be in a range from 5 μm to 80 μm (e.g., 10 μm to 60 μm, 20 μm to 40 μm, or 15 μm to 75 μm). Larger height values enable higher micro-well 112*a* volumes and thereby higher cellular population counts and higher metabolic product concentrations, both of which can increase the steady state average electrical parameter value, and changes therein, as measured by the electrode pairs 124.

The chambers 114*a* and 114*b* have a height of 4 μm, a maximum width of 100 μm and are connected to the micro-well 112*a* and channel 130 by connection conduits having a width of 10 μm. The chambers 114*a-h* extend vertically into the wafer 110 by a smaller distance than the micro-wells 112*a-d* (e.g., 4 μm>30 μm). This allows the majority of the cellular populations to remain within the micro-wells 112*a-d* when fluid is flowing from the micro-wells 112*a-d* into the chambers 114*a-h* and channel 130.

Figure 2C:
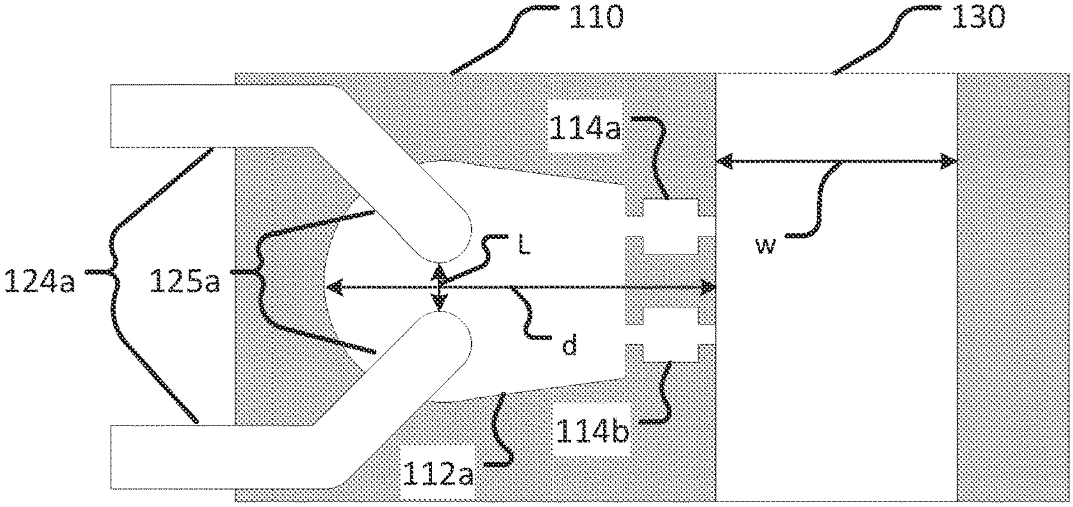

FIG. 2C shows the top-down view of FIG. 2A and includes the first ends 125*a* of the electrode pair 124*a*. The first ends 125*a* are oriented above and extend across the micro-well 112 by a portion of the first ends 125*a* length. The first ends 125*a* can be of any orientation, length, or width, such that a separation length, L, is maintained. As non-limiting examples, the first ends 125*a* can extend radially inward as depicted, in parallel, perpendicular, or co-linear into the micro-wells 112*a-d*. The separation length, L, can be in a range from 5 μm to 1000 μm, and the distance, L, is generally less than the diameter, d. In some embodiments, the separation length, L, can be between 100 μm to 800 μm, 200 μm to 600 μm, or 400 μm to 500 μm.

In some embodiments, the cellular population sustained within the micro-fluidic chip 100 is a microbial population. In some embodiments, the cellular population is a prokaryotic, eukaryotic, or archaic cellular population. In embodiments in which the cellular population is prokaryotic, the cellular population can include one or more of a *Salmonella enterica*, or *Escherichia coli* cellular population. As specific non-limiting examples, the cellular population can be a *Salmonella enterica* subsp. *enterica* serovar *typhimurium*, SL1344 strain ELH1301 or a *Escherichia coli* MG1655. In some examples, the cellular population can be a strain of *E. coli, Salmonella Typhimurium, Salmonella typhi, Yersinia enterocolitica, Serratia* (e.g., *Serratia marcescens, Serratia aquatilis, Serratia entomophila*, or *Serratia symbiotica*), *Bacillus Subtilis, Pseudomonas Aeruginosa, Staphylococcus, Bacteroides, Vibrio* (e.g., *Vibrio parahaemolyticus, Vibrio harveyi, Vibrio natriegens, Vibrio alginolyticus*), or Actinobacteria.

In certain embodiments, the cellular population includes one or more modifications to the cellular genome. The modifications can be made through any genomic modification method known in the art and can include electroporation and transformation. Briefly, electroporation, or electropermeabilization, is a microbiology technique in which an electrical field is applied to cells in order to increase the permeability of the cell membrane, allowing chemicals, reagents, or DNA to be introduced into the cell. A plasmid carrying one or more modification genes is introduced to the cellular population which is then exposed to electroporation. The increased permeability of the cellular population cell membranes facilitates the introduction of the plasmid into the cellular population lumen where the cellular population transforms the plasmid DNA and introduces the modification genes into the cellular genome. Examples of methods for performing electroporation/electropermeabilization are described, for example, in *Electropermeabilization, a physical method for the delivery of therapeutic molecules into cells*, by Marie-Pierre Rols, BBA-Biomembranes, Volume 1758, Issue 3, March 2006, the entire contents of which are incorporated by reference herein.

In certain embodiments, the cellular population includes at least two genetic modifications: a control gene and a promoter sequence. In some embodiments, the cellular population can include more than one control gene and/or more than one promoter sequence. The promoter sequence is a non-constitutive, e.g., inducible, promoter sequence which is active under certain conditions, such as active in the presence of an inducer agent. The inducer agent can be a target analyte or the inducer agent can interact with the target analyte present in the fluid supplied from the fluid source 150. In some embodiments, the promoter sequence is a positive inducible promoter sequence which promotes transcription of the control gene in the presence of the inducer agent. In alternative embodiments, the promoter sequence is a negative inducible promoter sequence which promotes transcription of the control gene in to the absence of the inducer agent. As an example, the cellular population genome includes a lac promoter which promotes transcription of the control gene when the isopropyl β-D-1-thiogalactopyranoside (IPTG) inducer agent is present. Alternative examples of the promoter sequences include pArs, pMer, pCop, pLux, pRpa, pLas, pRhl, pLac, pBAD, or pTet.

Examples of inducer agent include a chemical inducer agent, a temperature-sensitive inducer agent, or a light-sensitive inducer agent, such as IPTG, tetracycline, Doxycycline, Arabinose, or AHL. Alternative examples of inducer agents can include heavy metals or heavy-metal-containing molecules (e.g., arsenic, copper, zinc, mercury, etc.), bacterial signaling or quorum-sensing molecules (e.g., autoinducing peptides, or N-acyl homoserine lactones), bacteriophages (e.g., T4, Mu, P1, P2, λ, T5, HK97, N15, T7, T3, Φ29, P22, MS2, Qβ, Acidianus filamentous virus 1, *Sulfolobus islandicus* rod-shaped virus 1, Φ6, ΦX174, M13, PM2, or FLiP), sugars, metabolites, a light signal, and a temperature (e.g., an elevated, or a decreased temperature).

In general, a control gene can be any genetic sequence that controls the growth and/or metabolic activity of the cellular population. In some embodiments, the control gene may be multiple genes, gene fragments, genetic sequences, and associated regulatory species. Examples of control genes include, but are not limited to, single-gene lysis genes such as phage phiX174 lysis gene, E, which causes lysis of the bacterium *Escherichia coli*. Alternative lysis genes include multi-gene lysis genes such as λ S and the S107 genes, or the ϕ21 $S^{21}$ and the $S^{21}71$ genes. Cellular population genomes including a lac promoter that transcribes gene E after IPTG induction, causes lysis of the host. Therefore, presence of the IPTG inducer agent causes lysis of the host which ceases the production of charged metabolic products.

Alternative examples of control genes can include one or more genes from bacterial toxin-antitoxin (TA) modules. A TA module is a set of two or more closely linked genes that together encode both a "toxin" protein and a corresponding "antitoxin", which can perform cell functions such as responding to stresses, causing cell cycle arrest and bringing about programmed cell death. For example, mazEF, a TA locus found in *E. coli* induces programmed cell death in response to starvation. Other TA modules (e.g., Type I TA modules) are small, hydrophobic proteins which can confer toxicity by damaging cell membranes. Other non-limiting examples of TA modules include Type II, or Type III TA modules; symR/symE, tisB/istR-1, phd-doc, or ibs/sib module of *E. coli*; fstI/rnaII, higB/higA, hok/sok, vapB/vapC, ω-ε-ξ, paaR-paaA-parE, pasA/pasB/pasC, toxI/toxN, or ccdA/ccdB. Expression of TA module control genes can regulate the transcription in general, reducing cellular metabolism by reducing the overall expression of the host cell genome.

Examples of control genes can also include genes that express compounds which are generally toxic to bacteria, such as peptide toxins. For example, melittin is a toxin which is a component of bee venom. Increased expression of peptide toxins can produce a quorum sensing response in the cellular population triggering programmed cell death or apoptosis. Other examples of peptide toxins include mastoparan-L, APETx2, BDS-I and II, APETx1, ZorO, epidermal growth factor (EGF)-like toxin (gigantoxin I), or D (KLAKLAK)2, α-KTx peptides, cysteine-stabilized α/β (CSα/β) peptide toxins, or synthetic peptide toxins. Yet more non-limiting examples can include one or more bacterial genes producing proteinaceous toxins, e.g., bisin, halocin, lactococcin, mutacin, pediocin, pyocin, sakacin, vibriocin, nisin, microcins, colicins, tailocins, Class I, Class IIa/b/c, and/or Class III bacteriocins.

Figure 3A:
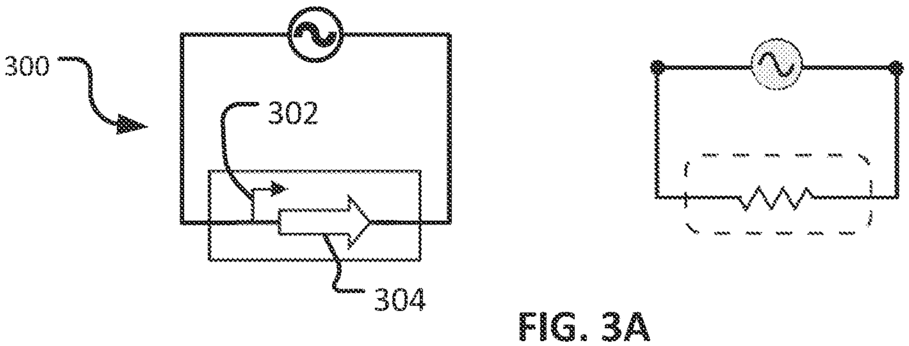
FIG. 3A is a schematic electronic diagram of a cellular circuit and the corresponding electrical circuit.

FIG. 3A depicts a genetic circuit 300 having an inducible promoter sequence 302 in sequence with a control gene 304. In the genetic circuit 300, the promoter sequence 302 is a positive inducible promoter which when the inducer agent is present in the cellular population environment, the promoter sequence 302 allows the control gene 304 to be expressed. When the control gene 304 is expressed, the host cell undergoes a change in its growth cycle, metabolic activity, or another disruption to its homeostatic state. For example, in some embodiments, the host cell undergoes lysis, the production of charged metabolic products ceases, and a conductivity parameter of the fluid in the micro-well 112 changes, reflecting the reduction in the production of charged metabolic products. As such, the change in the measured conductivity parameter is related to the presence of, and in certain embodiments the concentration of, the inducer agent. The genetic circuit 300 of FIG. 3A can be considered a ‘resistive’ genetic circuit (left) with the electrical conductivity parameter varying based upon the presence or absence of the inducer agent.

Figure 3B:
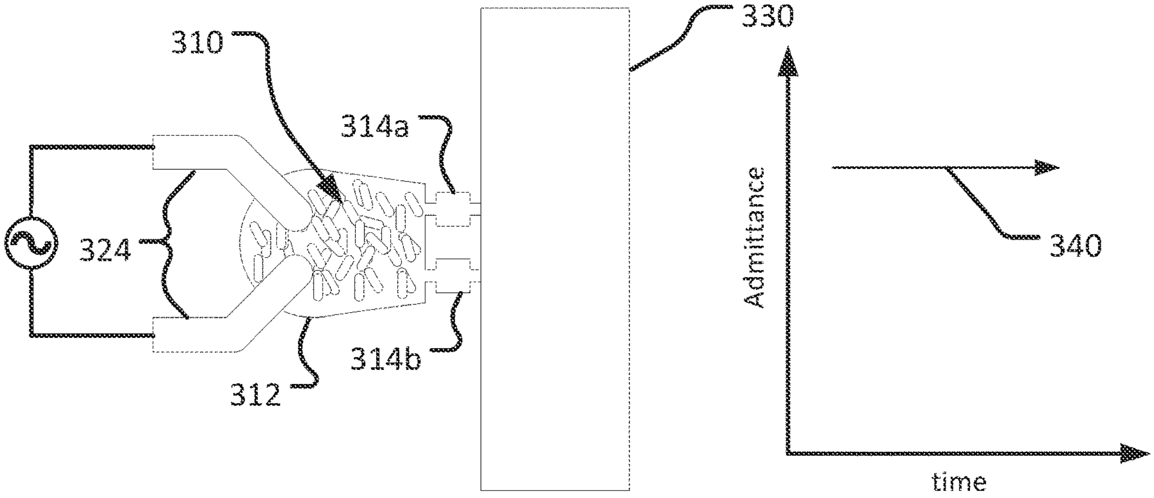
FIGS. 3B and 3C are schematic illustrations of a microwell including a cellular strain measuring a response to an analyte.
Figure 3C:
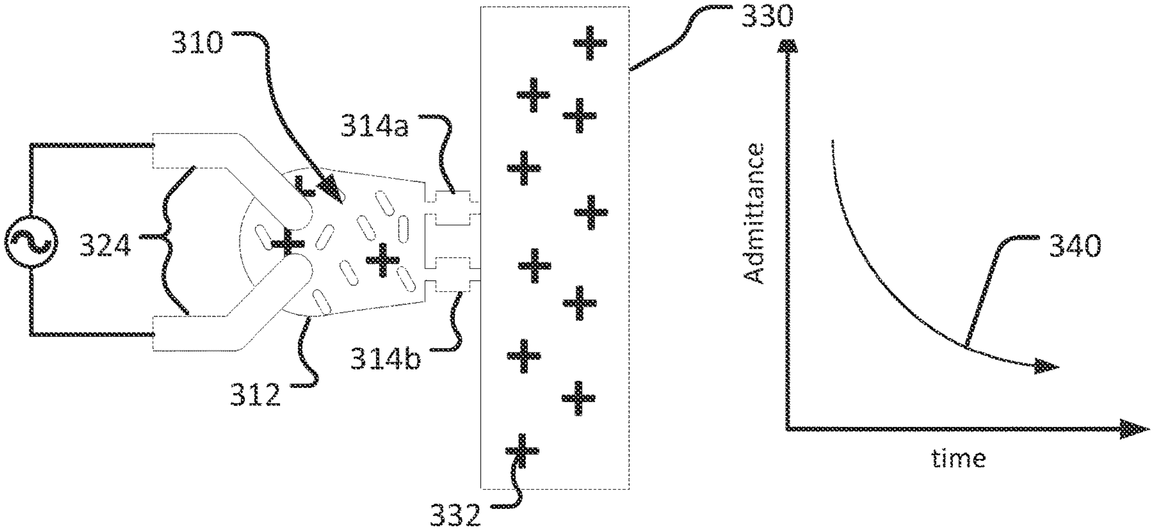

FIGS. 3B and 3C schematically illustrate a micro-well 312 including a cellular population 310 in a micro-well 312. The cellular population 310 includes the genetic circuit 300 of FIG. 3A. When the fluid flowing through the channel 330 does not include the inducer agent corresponding to the promoter sequence 302, the population does not undergo an induced change (e.g., communal lysis) and continues to produce charged metabolic products and maintains the measured electrical conductivity parameter value, as shown on the right. The right side of FIG. 3B shows a line chart comparing an electrical conductivity parameter on the y-axis, e.g., an admittance, as measured by the electrode pair 324 to time on the x-axis. The line chart includes a conductivity signal 340 showing the admittance profile over time. The cellular population 310 continues in a homeostatic growth cycle producing a constant amount of charged metabolic products and the conductivity signal 340 remains approximately constant, e.g., within a noise level of an average value.

As shown in FIG. 3C, the fluid in the channel 330 includes a quantity of inducer agent 332 such as inducer agents described herein. The inducer agent 332 flows into the micro-well 312 and the cellular population 310 within is exposed to the inducer agent 332. The inducer agent 332 interacts with the promoter sequence 302 which allows the control gene 304 to be expressed and cause the host cellular population 310 to undergo lysis responsive to the inducer agent 332. As the cellular population 310 lyses and ceases to produce charged metabolic products, the concentration of the metabolic products drops as the fluid within the micro-well 312 is exchanged with the fluid supplied by the channel 330, e.g., fluid supplied from the fluid source 150. As the concentration of metabolic products reduces, the measured electrical conductivity parameter value, e.g., conductivity signal 340, reduces correspondingly.

The genetic circuit 300 of FIGS. 3A through 3C is a resistive circuit that provides an output change in the conductivity parameter and produces conductivity signal 340. In general, the micro-well 312, which can correspond to the micro-wells 112*a-d*, of FIG. 1, can include multiple cellular populations 310 each including a different genetic circuit 300 based on upon different combinations of one or more promoter sequence 302, and one or more control gene 304. Combinations of promoter sequences 302 and control genes 304 can respond to one or more inducer agents 332 present in the channel 330 fluid and determine the output conductivity signal 340. Combinations of promoter sequences 302 and control genes 304 can produce conductivity signals 340 as constant, linear, polynomial, or oscillatory signals.

For example, if the concentration of the inducer agent 332 in the fluid supplied by the fluid source 150 changes with respect to time, the cellular population can respond accordingly either promoting or inhibiting the control gene based upon the inducer agent 332 concentration. The output conductivity signal 340 reflects the change in the inducer agent 332 concentration by increasing or decreasing correspondingly.

Figure 13:
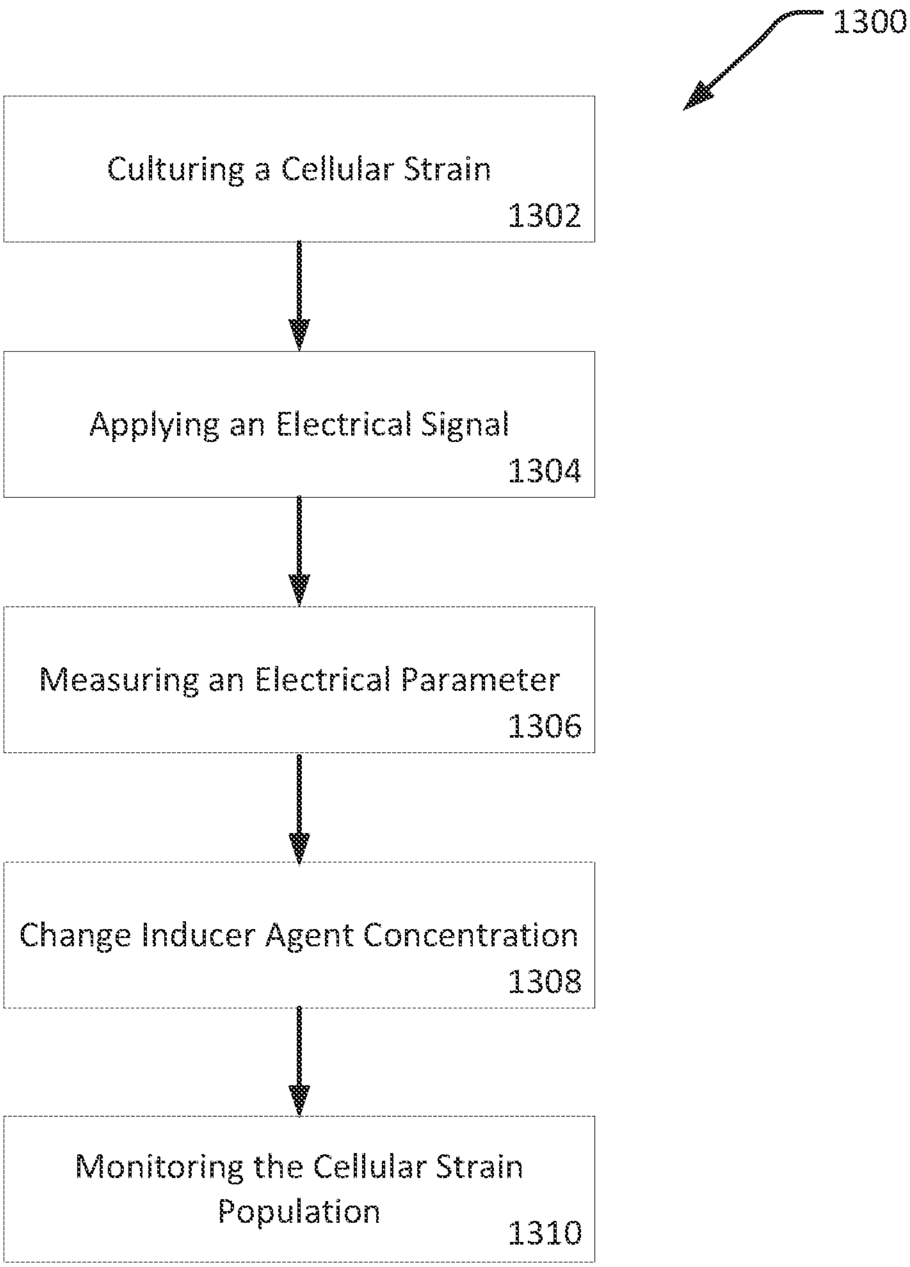
FIG. 13 is a flow-chart showing a set of example steps for detecting the presence of an inducer agent using a cellular integrated circuit.

FIG. 13 schematically illustrates an example method for using a micro-fluidic chip 100 including cellular integrated circuits 120 to detect the presence of a target analyte, and/or an inducer agent. A cellular strain is engineered to include one or more promoter sequences and one or more control genes, the promoter sequence(s) moderating the expression of one or more control genes. The cellular strain constitutes a cellular population and is cultured in a medium, such as a growth medium, in a micro-well 112 of a cellular integrated circuit 120*a-d* constructed on a micro-fluidic chip 100 (step 1302). The cellular population grows to a homeostatic growth cycle. A fluid source 150 supplies a fluid to the micro-fluidic chip 100 which can include a growth medium to maintain the cellular population. The fluid flows through the channel 130 and into connected chambers 114*a-h* and micro-wells 112*a-d* to continually exchange the fluid in the micro-wells 112*a-d* with new fluid from the fluid source 150.

The cellular integrated circuit 120*a-d* includes an electrode pair 124*a-d* having a WE and an R/CE in contact with the fluid within the micro-well 112. An electrical source 140 applies an electrical signal 142*a-d* to the electrode pair 124*a-d* to maintain a constant electrical potential between the electrode pair 124*a-d* (step 1304). The cellular population in homeostatic growth provides a concentration of charged metabolic products to the micro-well 112 fluid. The metabolic products provide an electrical connection between the electrode pair 124*a-d* and allows the electrical signals 142 to propagate through the solution.

The electrical source 140 determines an electrical parameter, such as a conductivity parameter, of the fluid by monitoring the change in the current applied to the WE with respect to time (step 1306). The electrical parameter is calculated from the applied current. As the concentration of the metabolic products change in the micro-wells 112*a-d* solution, the electrical parameter value changes correspondingly. Cellular populations in homeostatic growth cycles maintain a constant concentration of metabolic products and a corresponding constant electrical parameter value.

The promoter sequence of the cellular population responds to the concentration of, e.g., presence or absence of, an inducer agent and correspondingly promotes or inhibits expression of the control gene. The fluid supplied by the fluid source 150 can include the inducer agent, or can be caused to include the inducer agent, thereby changing the concentration of the inducer agent present in the fluid in the micro-wells 112*a-d* (step 1308), which modifies the expression of the control gene by interacting, e.g., binding, with the promotor sequence.

When expressed, the control gene modifies the metabolic process of the cellular populations. As described herein, in some embodiments, the expression of the control gene causes the cellular population to lyse thereby ceasing the production of metabolic products and decreasing the concentration of metabolic product in solution. The electrical source 140 monitors the measured electrical parameter for changes which is an indirect measurement of the cellular population (step 1310) and corresponds with the concentration of the inducer agent.

As discussed above, in some embodiments, wafer 110 contains a number of micro-wells 112*a-d* in electrical connection with electrode pairs 124*a-d*. The wafer 110 can be composed of a solid material, or a gel-based substrate such as a hydrogel optionally including one or more growth medium (e.g., culture media, minimal media, selective media, differential media, transport media, or indicator media), buffer, solution, suspension, or combination thereof. In some embodiments in which the wafer 110 is composed of a gel-based substrate, each microwell 112*a-d* can include a single channel 130 supplying the fluid to only the connected micro-well 112*a-d*, or one or more micro-wells 112*a-d* on the wafer 110. In some embodiments, the fluid source is configured to perfuse the fluid through the gel-based substrate to supply the micro-wells 112*a-d*.

In some embodiments, the cellular integrated circuits 120 are integrated with a biological sample, such as a tissue sample. The electrode pairs 124*a-d* of the cellular integrated circuits 120 can be affixed onto or into the biological sample. In some embodiments, the biological sample can be a tissue slice or tissue sample, such as a biopsy, a core biopsy, or needle aspirate, a fluid sample, such as a blood sample, urine sample, or saliva sample, a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample can be a preserved biological sample, including non-limiting examples of a formalin-fixed, or paraffin-embedded biological sample.

In some embodiments, the cellular population is a eukaryotic cellular population including at least two genetic modifications, such as a protist (e.g., *Guillardia theta, Plasmodium falciparum, Plasmodium yoelii yoelii, Cryptosporidium hominis, Cryptosporidium parvum*, or *Thalassiosira pseudonana*), plant (e.g., *Arabidopsis thaliana, Cyanidioschyzon merolae, Oryza sativa, Ostreococcus tauri, Populus trichocarpa*), fungi (e.g., *Saccharomyces cerevisiae, Encephalitozoon cuniculi, Schizosaccharomyces pombe, Neurospora crassa, Phanerochaete chrysosporium*), insect (e.g., *Drosophila melanogaster, Anopheles gambiae*), or animal (e.g., *Caenorhabditis elegans*, or *Takifugu rubripes*) cellular population. In some embodiments, the cellular population is a mammalian cellular population (e.g., *Homo sapiens*).

As discussed above, in some embodiments, electrical source 140 measures a conductivity parameter of the medium, which is optionally used to determine a value of at least one of an electrical admittance of the medium, an electrical impedance of the medium, an electrical conductance of the medium, an electrical resistance of the medium, and/or a value of another quantity that is related to any of these (e.g., a value of a quantity from which admittance, impedance, conductance, and/or resistance can be determined for the medium). As such, an electrical source 140 can function as both a source of an electrical potential difference, and a detector. In certain embodiments, the systems and devices described herein can include a separate detector from electrical source 140. The detector can be implemented as any one of a variety of conventional electrical detectors that measure any of the quantities described above. Such detectors are well known in the art and widely available commercially, and can be readily connected to and/or integrated with the other components of the systems and devices described herein.

In certain embodiments, the systems and methods described herein include one or more electronic processors. The electronic processor(s) can be connected to any of the other components described herein, and can transmit and/or receive information to any of the other components. In particular, the electronic processor(s) can transmit control instructions to any of the other components to perform any of the actions and steps described in connection with any of the methods herein including, but not limited to, regulating the flow of growth media, introducing an inducer agent, detecting values of any of the quantities described above, and determining whether an inducer agent (e.g., a target analyte) is present in the medium based on changes in detected values of any of the above quantities.

The systems and devices can also optionally include components such as a storage medium (e.g., a non-transitory storage medium such as a ROM, magnetic storage device, optical storage device, and/or solid state storage device) for storing instructions for the electronic processor(s) and measured values obtained by the electronic processor(s), an input interface (e.g., a touchscreen and/or a conventional computing interface such as keypad, keyboard, and/or pointing device), and an output device (e.g., a display device such as a screen, an interface to a remote computing device such as a server, a computer, and/or a mobile phone). Each of these components can optionally be connected to the electronic processor(s).

Software instructions executed by the electronic processor(s) to perform any of the control and other functions and steps described herein can be stored in a memory unit connected to the electronic processor, and accessible to retrieve the instructions for execution. The instructions can also be implemented as a computer storage product with a nontransitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Certain methods and steps described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

EXAMPLES

To transduce gene circuit output to an electronic signal, bacterial circuits were engineered to be capable of controlling the release of ionic species via cell growth and death. Inert gold electrodes were used to measure the AC impedance when applying a sinusoidal voltage signal to the bacterial population without externally added redox mediators (FIG. 4A).

Figure 4A:
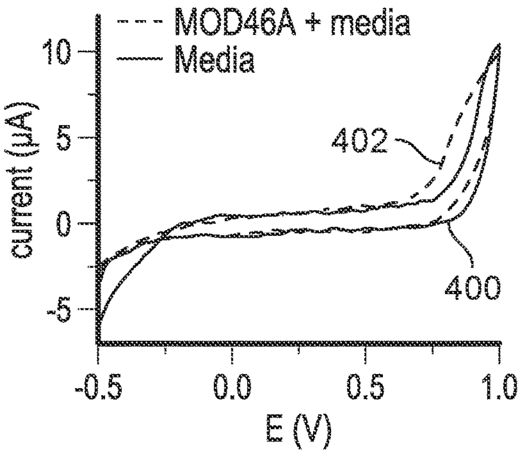
FIG. 4A is a line chart comparing voltammetry measurements of a cellular population versus media only.

FIG. 4A is a line chart comparing current (μA) on the y-axis to potential (V). The chart depicts cyclic voltammetry measurements showing the inert redox response of MOD46A strain in growing media (grey line 400) and media in absence of cells (black line 402). A potential signal was applied to the media initially at −0.5 V and increased to 1 V. The potential signal was then decreased to −0.5V. Lines 400 and 402 increase and decrease cyclically corresponding with the applied voltage, initiating and returning to less than −2.5 μA. The MOD46A+media line is below the media-only line at between approximately −0.5V to −0.25 V and approximately 0.75 V to 1 V.

Figure 4B:
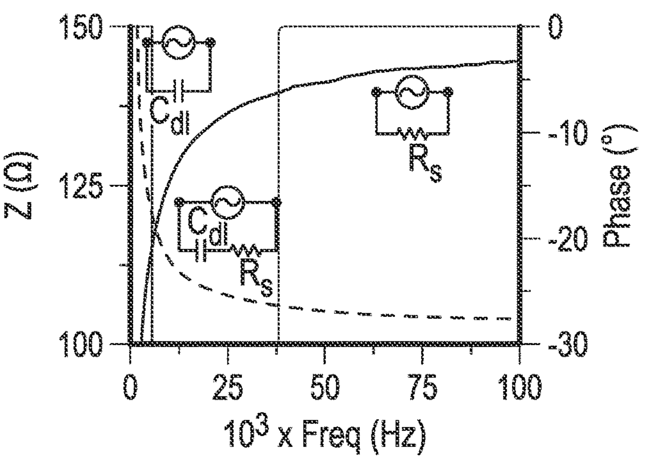
FIG. 4B is a three-axis line chart comparing impedance and signal phase versus frequency for a cellular population.

This measurement includes resistive and capacitive effects which can be decoupled by using different input potential frequencies between 1 Hz to 100 kHz. FIG. 4B is a three-axis line chart comparing impedance (Ω) on the left axis and phase (°) on the right axis versus frequency ($10^3$ Hz) on the x-axis (e.g., a Bode plot) for the MOD46A strain. The impedance (black line) decreases and the phase (grey line) increases as frequency increases and correspondent equivalent circuits in the different range of frequencies.

The correspondent Bode plots (representing impedance over frequency) indicate that at high frequencies (e.g., the grey box from $30\times10^3$ Hz to $100\times10^3$ Hz), the AC current and voltage signals were in phase with each other and the corresponding genetic circuit was resistive (shown inset). At these frequencies, the phase is approximately 0, and therefore, the circuit is simplified to an active bacterial media resistance. At low frequencies (e.g., the grey box from $0\times10^3$ Hz to $5\times10^3$ Hz) the corresponding biological circuit was capacitive (shown inset) and at mid-range frequencies (e.g., the white box from $5\times10^3$ Hz to $30\times10^3$ Hz) the corresponding genetic circuit was capacitive and resistive.

Figure 4C:
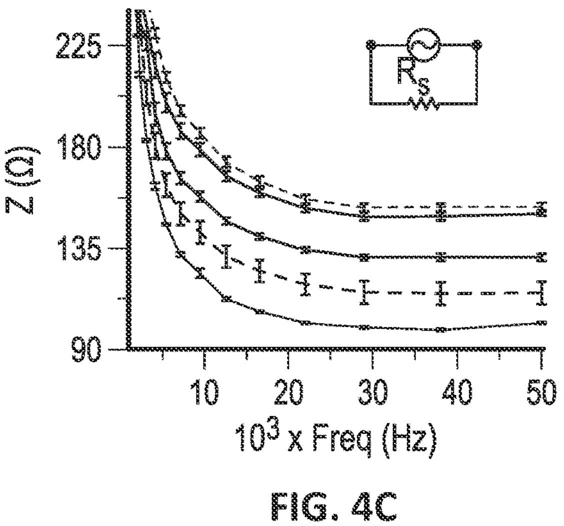
FIGS. 4C and 4D are line charts comparing impedance versus frequency for a cellular population.

FIG. 4C is a Bode plot for fresh LB media (second line from top), only bacteria (top line), supernatant (bottom line), saturated culture (second from bottom line), and heat-killed culture (middle line) between 1000 to 50,000 Hz, where impedance measures resistive effects. Error bars show standard deviation for n=3 samples.

Figure 4D:
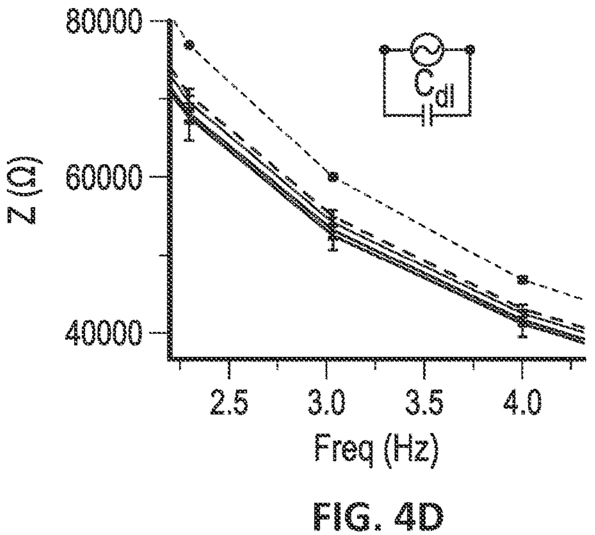

FIG. 4D is a Bode plot for the same samples as FIG. 4C between 1.5 and 4 Hz, where impedance measures resistive effects (e.g., where the equivalent circuit corresponds to a capacitor according to FIG. 4B). The lines correspond to fresh LB media (second from bottom line), only bacteria (top line), supernatant (middle line), saturated culture (second from top line), and heat-killed culture (bottom line).

Since the impedance resulting from these resistive effects (FIG. 4C) was generally more robust to changes in the input frequency than the one at lower frequencies (FIG. 4D), the culture resistance was tracked. In addition, this optimized measurement was found to correlate with the population density (monitored via turbidity) as opposed to measurements at lower frequencies (e.g., see FIGS. 5A through 5C, which are discussed below).

Figure 5A:
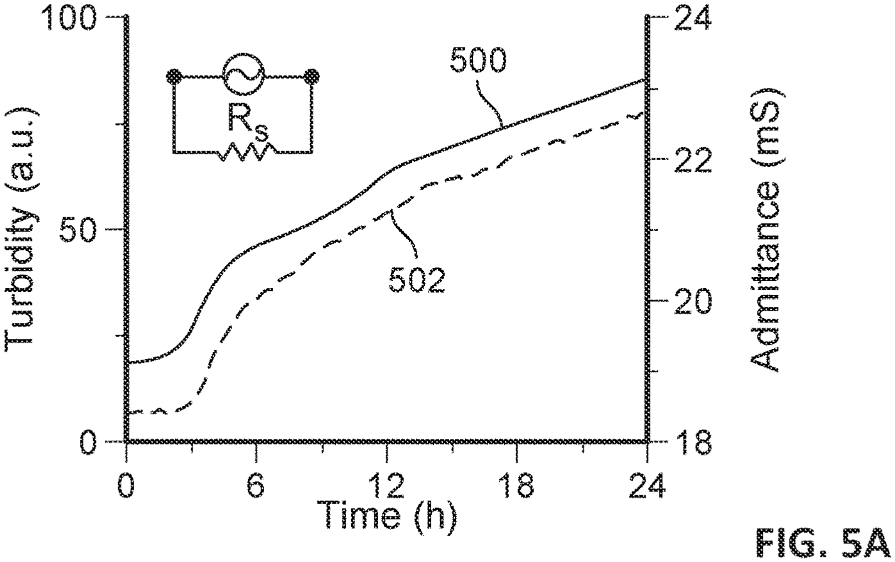
FIGS. 5A through 5C are three-axis line chart comparing turbidity and admittance versus time for cellular populations.
Figure 5B:
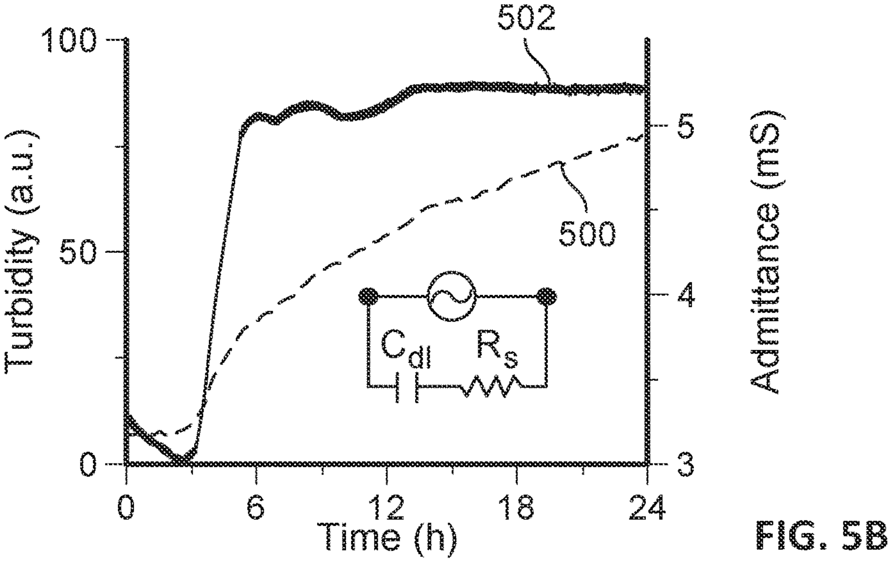
Figure 5C:
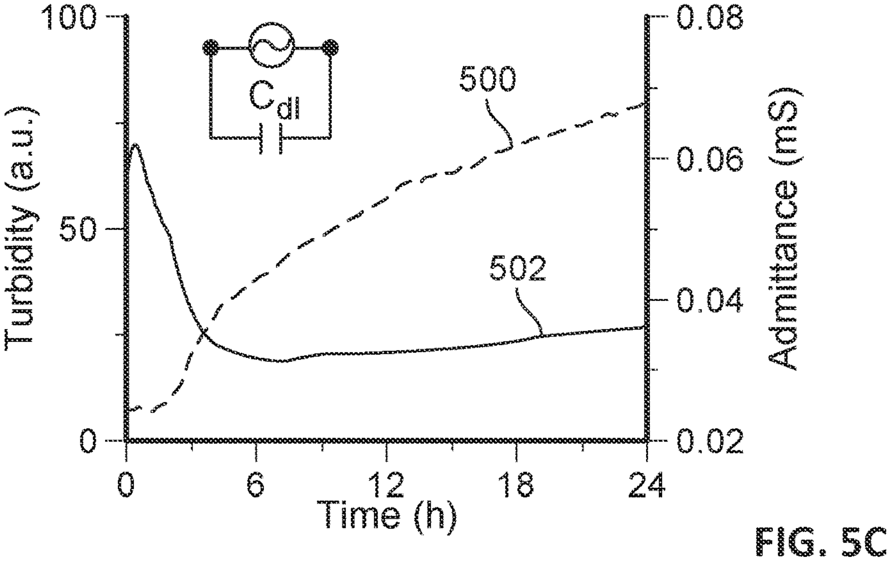

FIGS. 5A through 5C are line charts showing signal optimization results using wild-type bacteria. FIGS. 5A through 5C are three-axis line charts comparing turbidity (a.u.) on the left axis and Admittance (μS) on the right axis to time (hours) on the x-axis. FIGS. 5A through 5C show profiles of turbidity (500) and admittance (502). FIG. 5A corresponds to the resistance frequency range, FIG. 5B corresponds to the combined frequency range, and FIG. 5C corresponds to the capacitive frequency range of FIG. 4B, respectively, e.g., for strain MG1655 *E. coli* at 100 kHz (FIG. 5A), intermediate 1.5 kHz frequencies (FIG. 5B), and low 1 Hz (FIG. 5C).

To demonstrate the electrochemical interface with a minimal expression system in bacteria, a previously described construct pE35GFP containing a bacterial lysis gene was tested. The engineered bacteria grew to a stable density in the continuous culture before triggering the lysis gene upon chemical induction with isopropyl β-d-1-thiogalactopyranoside or IPTG. A decrease of more than half in culture density upon lysis induction, corresponding to an admittance (inverse of the impedance) change of approximately 2 mS (see FIG. 6B) was observed.

Figure 6A:
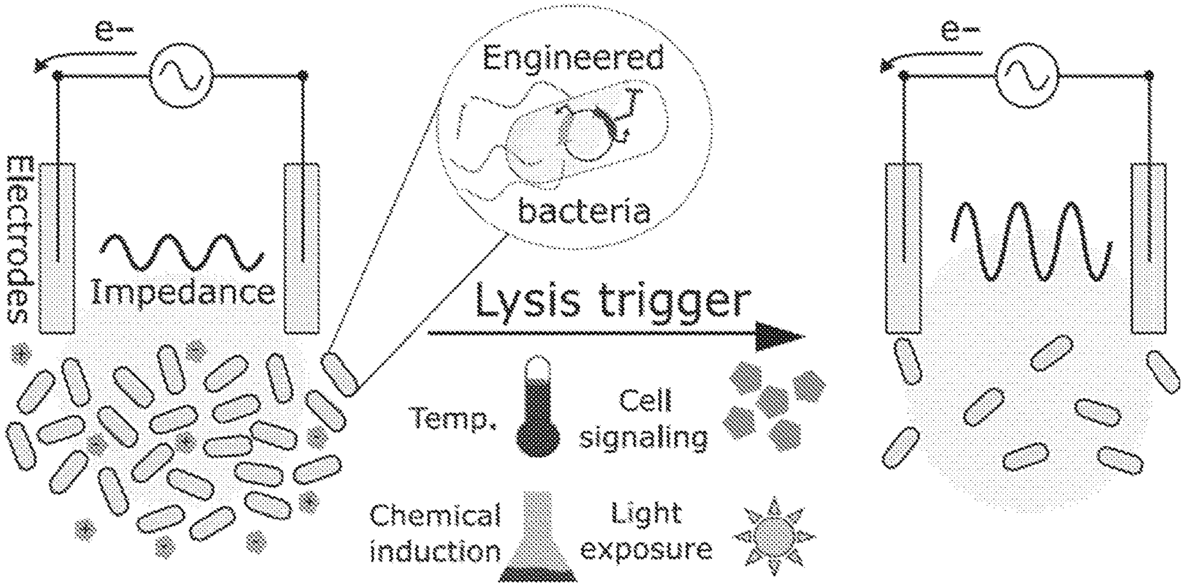
FIG. 6A is a schematic diagram showing the process of using engineered cellular populations to detect the presence of an inducer agent.

FIG. 6A is a schematic illustration of the approach using a culture of bacteria with a killing gene as the circuit output in contact with inert gold electrodes. The impedance of the culture reduces during growth (left) and increases upon the induction of bacterial death due to the clearance of charged metabolites (right).

Figure 6B:
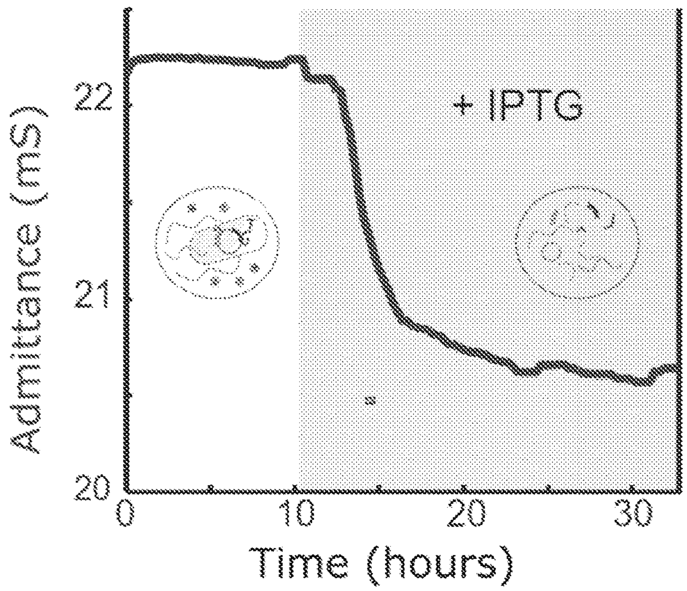
FIG. 6B is a line chart comparing admittance versus time for a cellular population in the presence of IPTG.

FIG. 6B is a line chart comparing admittance (μS) on the y axis to time (hours) on the x-axis. The line of FIG. 6B is the admittance, which is the inverse of impedance, using an IPTG-inducible lysis construct (pE35GFP) in an electrochemostat device. The shaded region represents induction of lysis with 1 mM IPTG in the medium.

FIG. 6B demonstrates that the induction of bacterial lysis was sufficient to cause a marked change in the conductive properties of the culture. In addition, the impedance was lower in a heat-killed culture than in an intact one (FIG. 4C).

Figure 4E:
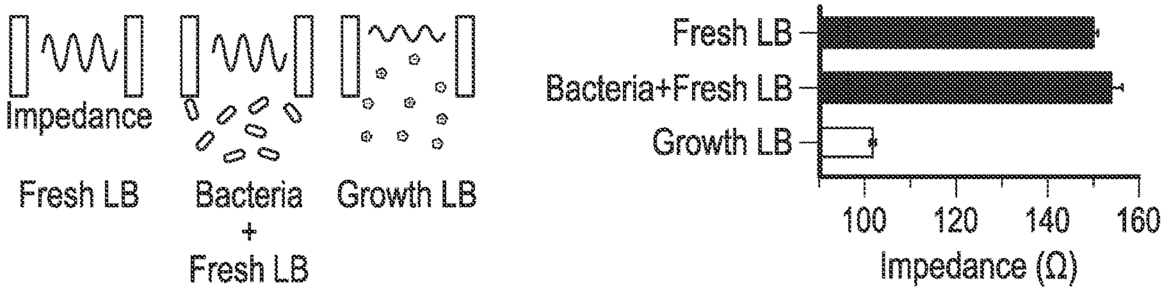
FIG. 4E is a schematic diagram and a bar chart histogram showing the impedance contributions from media, a solution of concentrated bacteria, and depleted medium.

The contribution of the bacterial cells and their metabolic by-products to the culture resistance (FIG. 4C to 4E) was also investigated. Resistive effects were dependent on the metabolic by-products from the bacterial growth and not the bacterial cells (FIG. 4E). FIG. 4E is a schematic illustration and histogram showing the different impedance contributions without additional redox mediators from fresh LB media, a solution of fresh LB with concentrated bacteria, and depleted LB medium resulting from bacterial growth. Error bars represent standard deviation for n=3 samples.

Figure 6C:
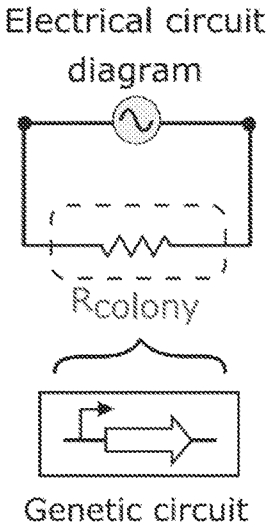
FIG. 6C is a schematic diagram comparing the genetic circuit to an electrical circuit.

Since the engineered bacteria are essentially modulating the flow of electrical current in this circuit, they can be viewed as a bacterial "conductor" (or "resistor"), where the conductance or admittance can be modulated by genetic modifications that control the population dynamics. FIG. 6C is a schematic illustration of the equivalent electrical circuit for the strategy using an alternating input voltage. The bacterial population is visualized as a simplified resistor, the output of which is controlled by the genetic circuit.

Figure 6D:
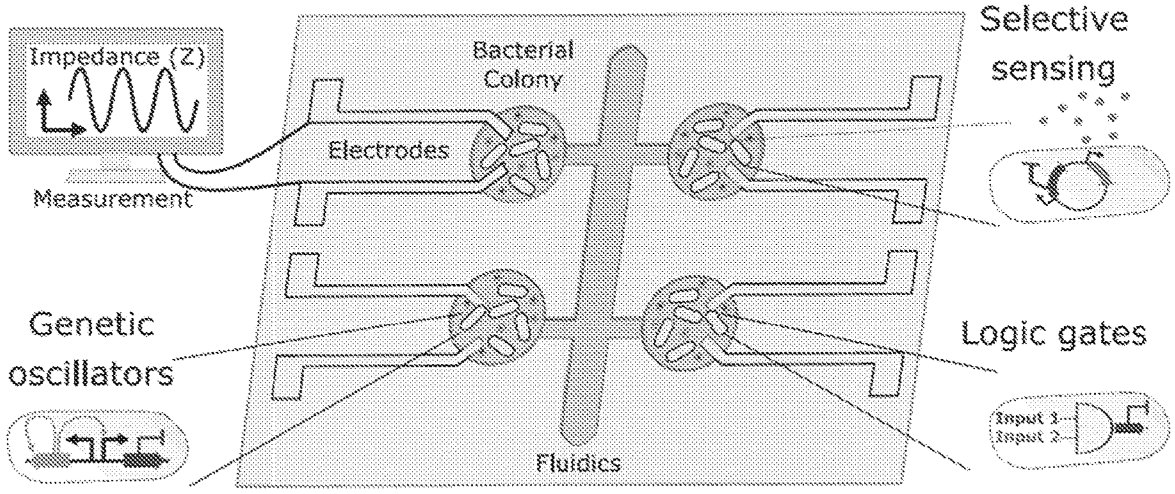
FIG. 6D is a schematic diagram showing the components of a micro-fluidic chip including four cellular integrated circuits.

A platform interfacing this property with genetic circuits can be envisioned, where bacterial colonies with unique circuit behaviors (sensors, logic gates, and/or oscillators) are directly connected to electrodes. FIG. 6D is a schematic diagram showing a microelectronic platform to interface between engineered bacteria and electronics. Several chambers may contain unique genetic circuits, connected via electrodes to an impedance detector.

The dynamics of gene circuits have primarily been investigated using well-defined submillimeter-scale bacterial colonies. Interfacing synthetic biology with electrodes utilizes robust population behavior at larger scales, where dynamical behaviors are less characterized. To study the dynamic behavior in a macroscale continuous culturing system, a customized milliliter scale chemostat with disposable gold electrodes in contact with the culture was fabricated, shown in FIG. 7A and FIG. 8A).

Figure 7A:
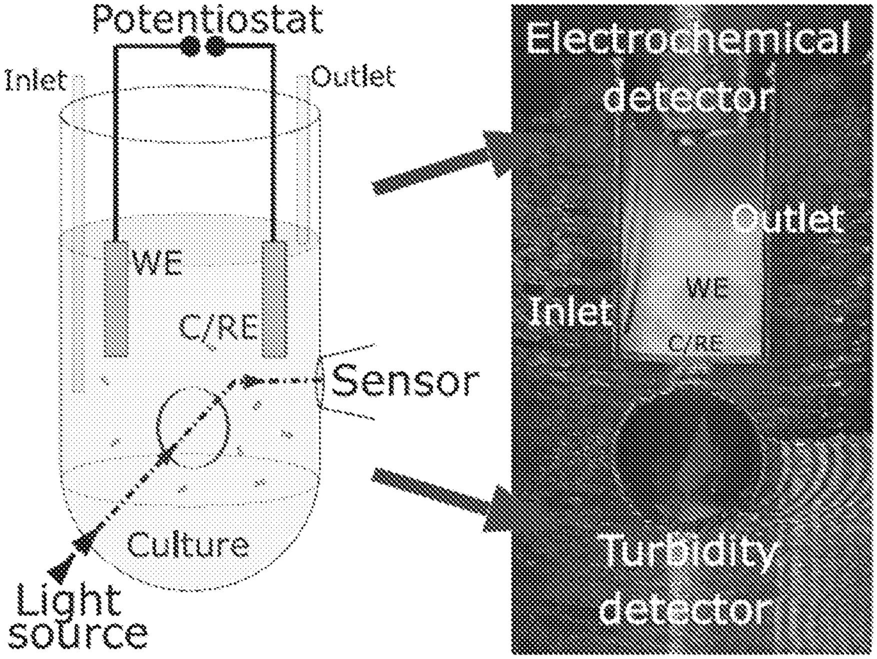
FIG. 7A is a schematic diagram and a picture of an experimental setup to measure the electrical parameter and turbidity response of a cellular population to an inducer agent.

FIG. 7A is a schematic illustration (left) and image of electrochemostat components included in a 3D-printed holder containing a culture tube, in which the disposable electrode consisting of gold counter/reference (C/RE) and working (WE) electrodes are immersed, and an external turbidimeter detector.

Figure 8B:
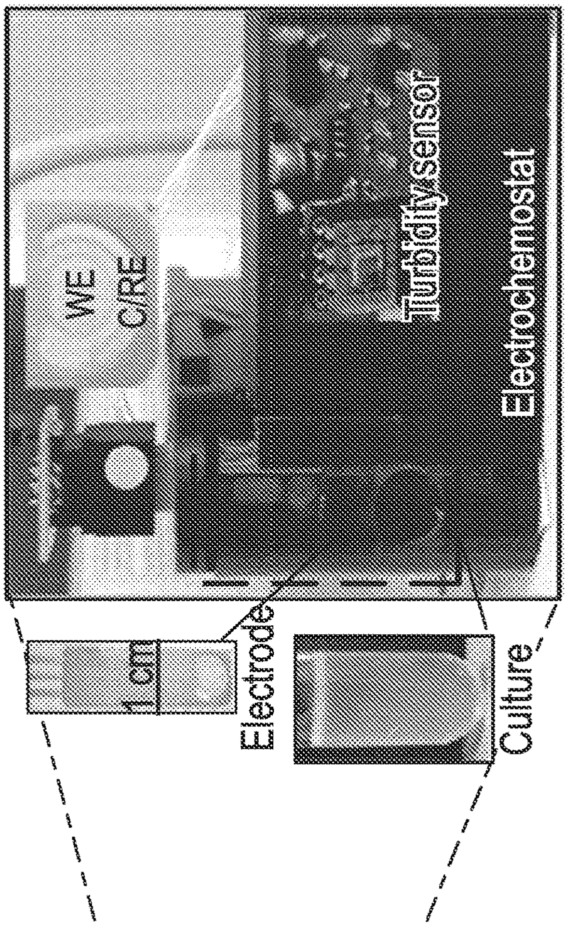
FIG. 8B is an image of certain components of the system of FIG. 8A including a culture tube.
Figure 8A:
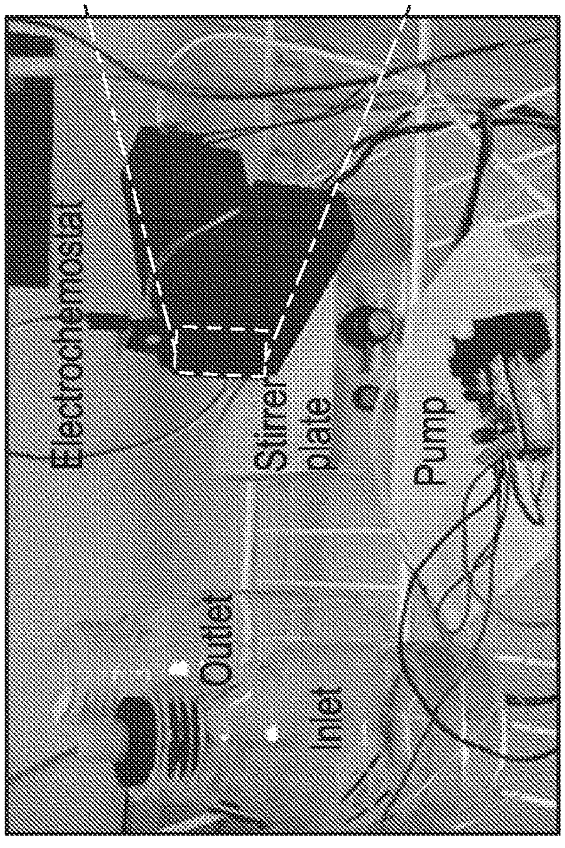
FIG. 8A is an image of a macro-chemostat system showing a pumping system under continuous mixing conditions.

FIG. 8A is an image showing the complete macro-chemostat set-up including the pumping system under continuous mixing conditions (left) and an image of 'electrochemostat' components included in a 3D printed holder containing a culture tube, in which the disposable electrode consisting of gold counter/reference (C/RE) and working (WE) electrodes are immersed, and a printed turbidimeter circuit board (right). The image of FIG. 7A was taken within the dashed box on the left image of FIG. 8A.

Figure 8C:
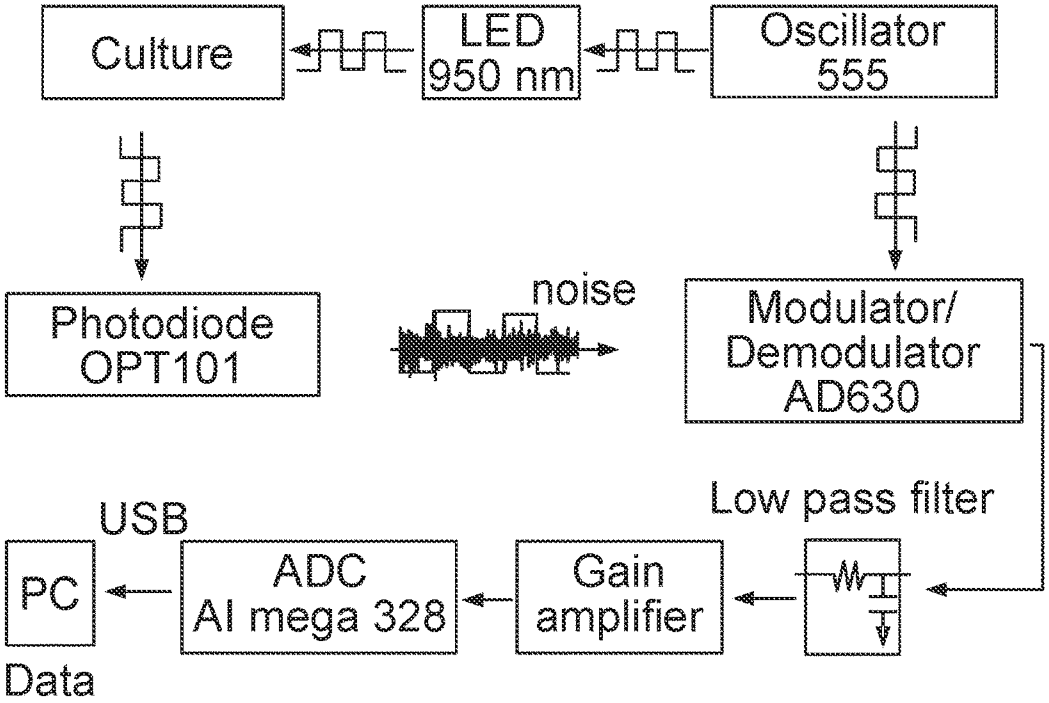
FIG. 8C is a schematic diagram showing a customized turbidity sensor.
Figure 8D:
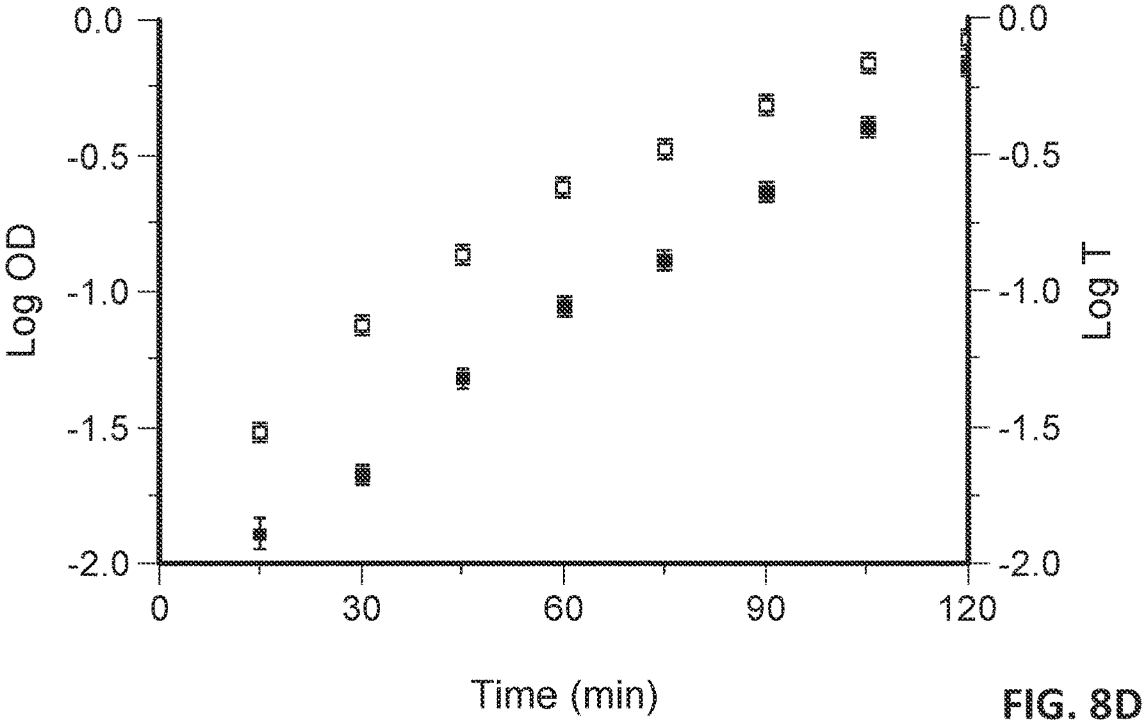
FIG. 8D is a three-axis line chart comparing optical density and transmittance as a function of time.

A turbidity sensor provided real-time data and direct correlation between impedance and culture density, resulting in an "electrochemostat" system (FIGS. 8C and 8D). FIG. 8C is a schematic illustration of the complete macro-chemostat system showing the pumping system under continuous mixing conditions. FIG. 8D is a three-axis line chart comparing the logarithmic optical density (OD) at 600 nm on the left axis (corresponding to the upper points) and the logarithmic transmittance on the right axis (corresponding to the lower points) to time (min) on the x-axis using a culture containing MG1655 *E. coli.*

Figure 7B:
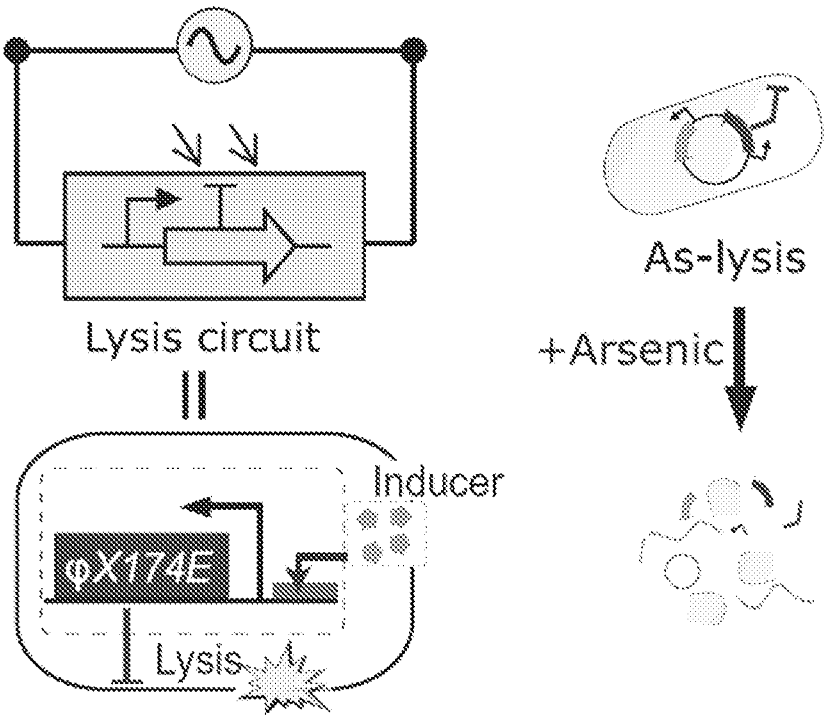
FIG. 7B is a schematic diagram showing the genetic circuit for detecting the presence of arsenic.

A cell population with a control gene capable of inducing lysis in the presence of a heavy metal toxin (e.g., arsenic) was investigated (As-lysis, as shown in FIG. 7B). FIG. 7B is a schematic illustration of an equivalent electrical circuit for a bacterial population engineered with an inducible promoter driving the expression of the lysis gene, E, and schematic of engineered bacterial (As-lysis) death upon arsenic induction.

Figure 7C:
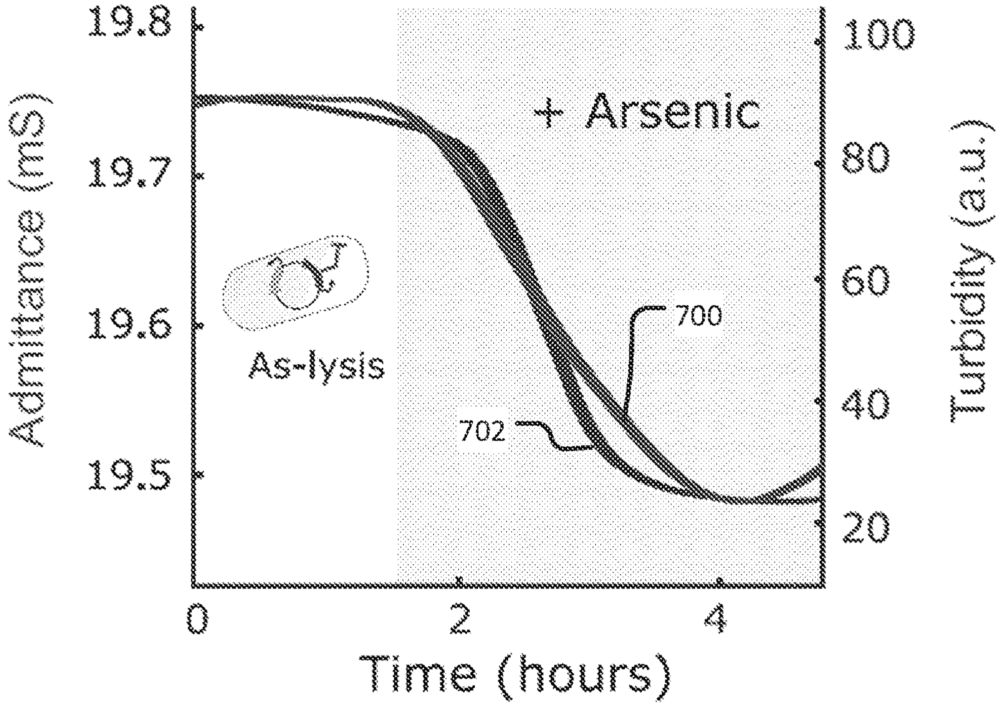
FIGS. 7C and 7D are three-axis line chart comparing turbidity and admittance versus time for arsenic- and copper-sensing cellular populations, respectively.

After reaching a steady population state, a fast triggering of lysis resulted from the induction with arsenic, in both admittance and turbidity was observed in FIG. 7C. FIG. 7C is a three-axis line chart comparing the profiles of the admittance (700) and turbidity (702) using an arsenic-sensitive strain in an electrochemostat device. The shaded region represents the duration of 250-ppb arsenic induction.

Figure 7D:
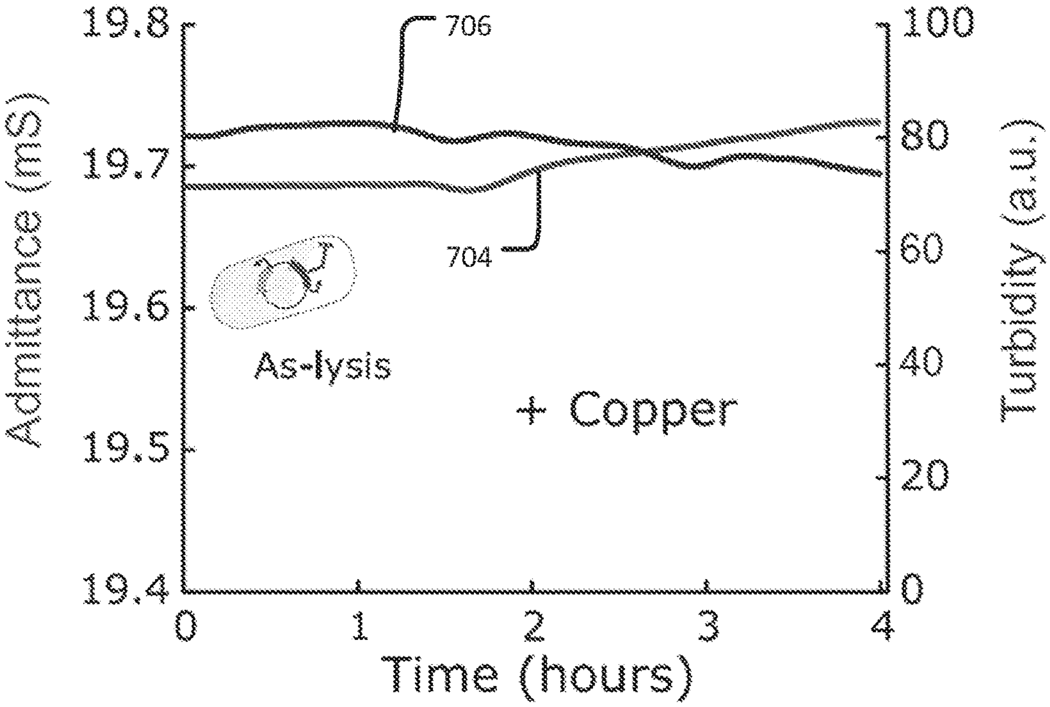

Good reproducibility was found for the drop in signal with relative standard deviations (RSDs) of 7.2 and 2.1% for turbidity readouts, respectively, in n=3 experiments. On the other hand, this bacterial cell population did not lyse in response to a related toxin such as copper. FIG. 7D is a three-axis line chart comparing the profiles of the admittance (704) and turbidity (706) using an arsenic-sensitive strain with 250 ppb copper in an electrochemostat device.

Figure 9B:
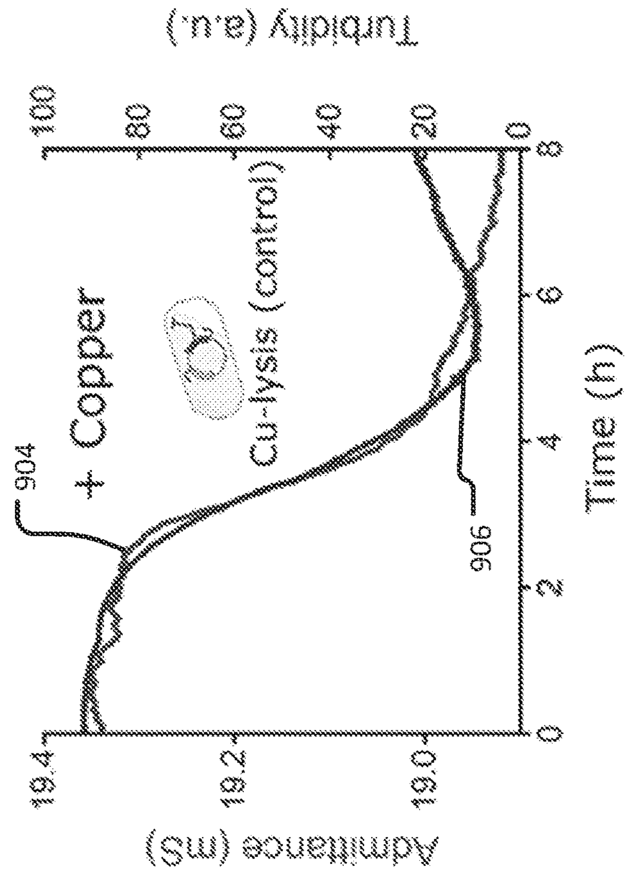
FIGS. 9A and 9B are three-axis line chart comparing turbidity and admittance as a function of time for arsenic- and copper-sensing cellular populations, respectively.
Figure 9A:
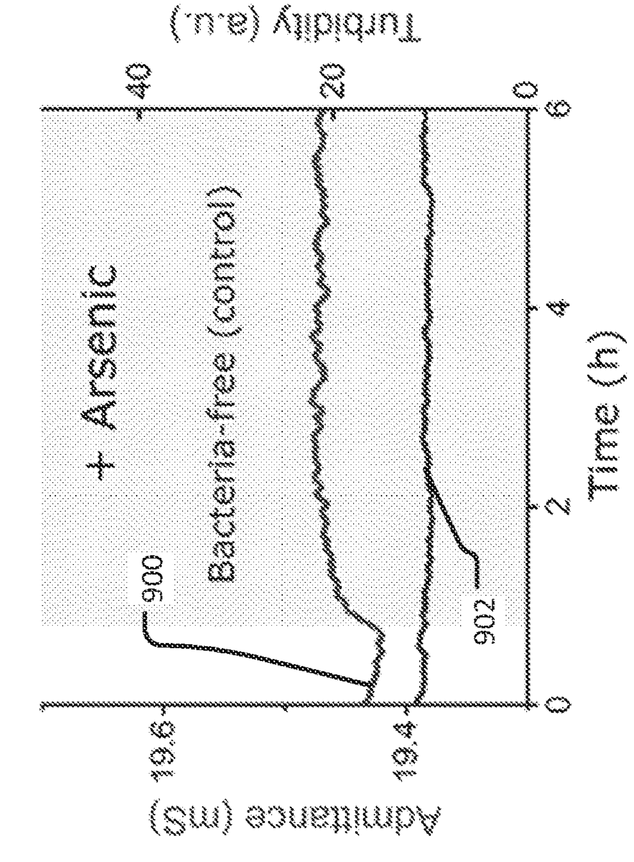

Furthermore, the absence of sensitive bacteria showed a negligible increase in conductivity and no change in turbidity when induced with arsenic. FIG. 9A is a three-axis line chart comparing the profiles of the admittance (900) and turbidity (902) for LB media in absence of bacteria with shaded region representing induction with 250 ppb arsenic.

Figure 7E:
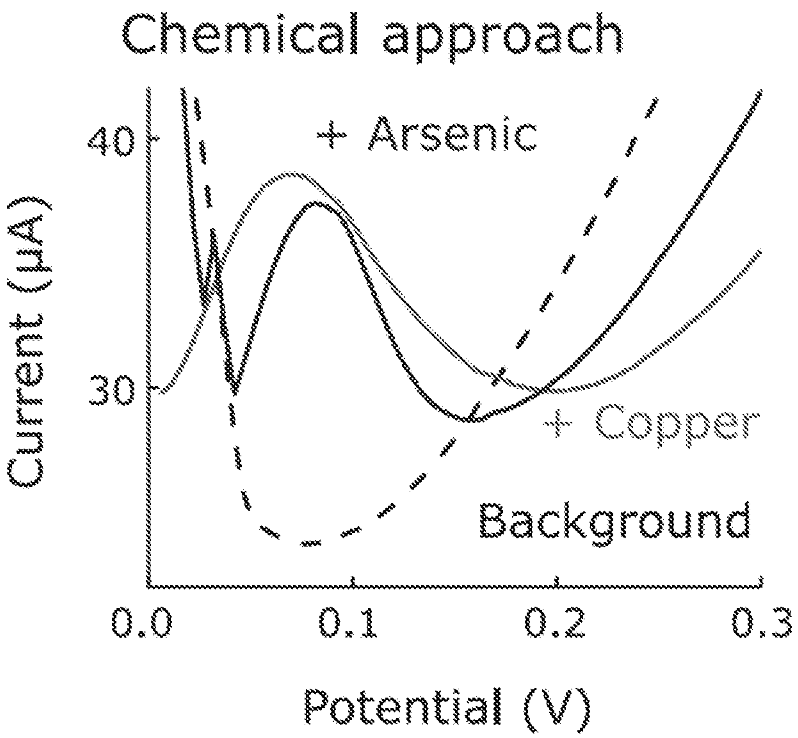
FIG. 7E is a line chart comparting current to potential in the absence and presence of arsenic and copper in solutions including arsenic- and copper-sensing cellular populations.

This arsenic biosensor was compared with a chemical sensing methodology, stripping voltammetry. This approach relies on the reduction of the arsenic ions on the gold electrode and next stripping and study of the arsenic oxidation at different potentials. Arsenic and copper were individually detected at +0.20 V versus Ag/AgCl. FIG. 7E is a line chart comparing measured current (μA) on the y-axis to potential (V) on the x-axis and showing square-wave voltammetry profiles for 250-ppb arsenic (black) and 250 ppb copper (grey). The dashed line shows the signal of the $HNO_3$ buffer (background). The oxidation potential at the maximum current intensity versus background signal is indicative of the presence of the metal.

Figure 7F:
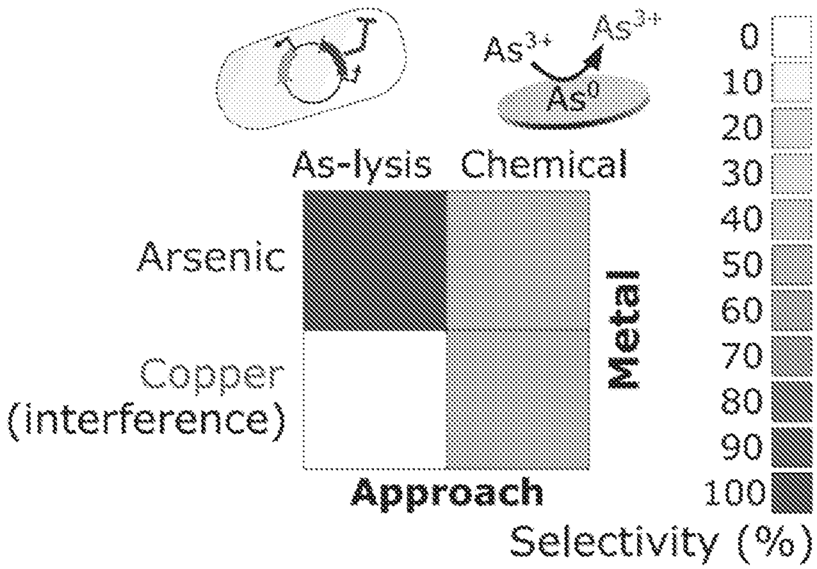
FIG. 7F is a heat map diagram of selectivity to arsenic versus copper in arsenic- and copper-sensing cellular populations.

However, the similarity in oxidation potential causes copper to interfere in the chemical approach for arsenic analysis but not for the bacterial approach. FIG. 7F is a heat map of selectivity to arsenic versus copper using both bacterial lysis and chemical approaches. A further control using a copper-sensitive strain (Cu-lysis) demonstrated the lysis triggering in the presence of copper. FIG. 9B is a is a three-axis line chart comparing the profiles of the admittance (904) and turbidity (906) including for copper detection using copper-sensitive strain with shaded region representing induction with 250 ppb copper (shaded area). Thus, using the bacterial lysis approach described above, it was possible to discriminate between two related heavy metal toxins compared to the standard electrochemical assay for this application, in which discrimination is considerably more difficult.

Figure 10A:
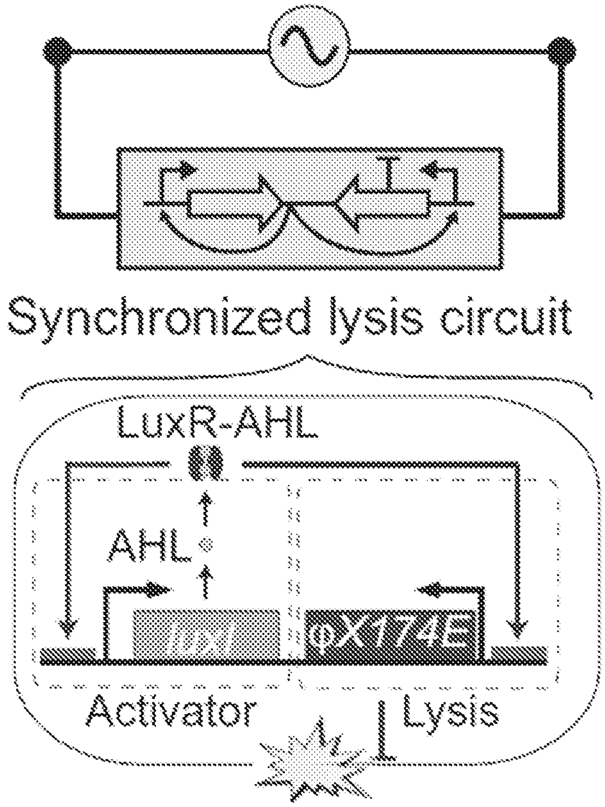
FIG. 10A is a schematic diagram showing an oscillatory genetic circuit.

The detection methods described herein can also be applied to oscillatory synthetic circuits such as the synchronized lysis circuit (SLC). FIG. 10A is a schematic illustration of the equivalent electrical circuit when using a SLC connected to the potential source. The circuit is composed of an AHL-based quorum sensing system driving a phage lysis gene. The protein LuxI regulates the AHL-based quorum sensing system. This bacterial circuit was previously shown to generate oscillatory population dynamics in microfluidic devices and in animal models, which occurs via cycles of growth and lysis. The genetic circuit contains a common promoter (pLuxI) that drives the expression of LuxI, which produces the quorum sensing molecule acyl homoserine lactone (AHL) that further activates the promoter by binding the activator LuxR.

Figure 10B:
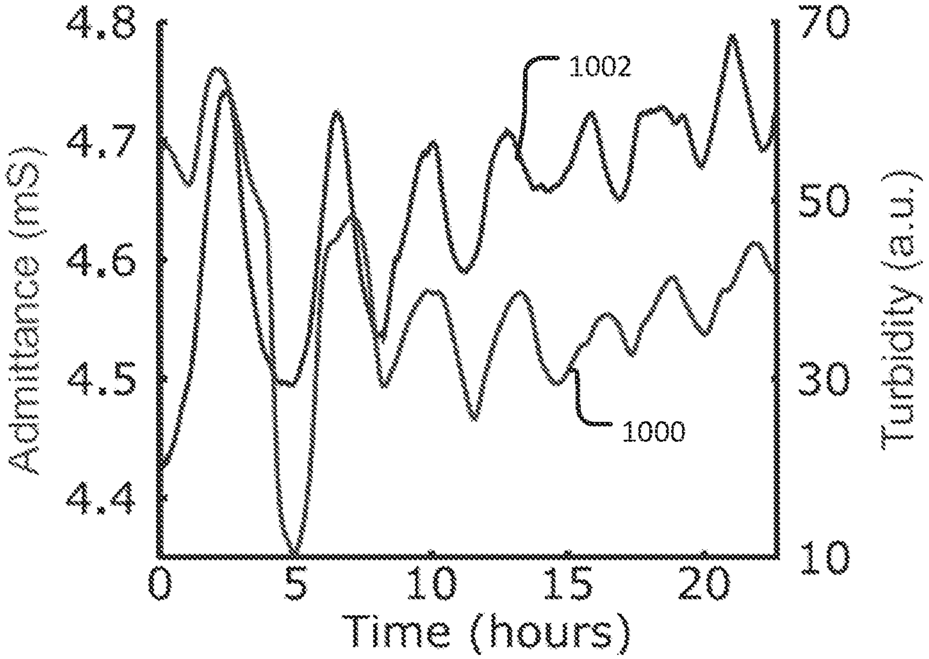
FIG. 10B is a three-axis line chart comparing turbidity and admittance as a function of time for the oscillatory genetic circuit of FIG. 10A.

The promoter also drives the expression of the lysis gene from the phage phiX174, E. AHL provides an intercellular synchronization mechanism: after reaching a threshold level, synchronized lysis at the population level ensues. A remaining population of bacteria yields new AHL where the cycle repeats, resulting in oscillatory growth and lysis behavior. When measuring the SLC strain with the electrochemostat, oscillatory culture density was observed, with corresponding behavior in the admittance signal over time. FIG. 10B is a three-axis line chart comparing the profiles of the admittance (1000) and turbidity (1002) using this strain in an electrochemostat device. The SLC is harbored by a strain *Salmonella enterica* subsp. *enterica* serovar *Typhimurium.*

Correlation of the periodical lysis events was found between the admittance and turbidity signals, with a period of 3.2±0.6 hours. The long-term bacterial population oscillations resulted in accumulation of bacterial debris over time, leading to increasing baseline in the turbidity signal. Compared to common variable resistors, which usually require manual manipulation or computer coding to modify the resistance, the SLC allows a bacterial population to exhibit autonomous oscillatory resistance variations over time.

Figure 11A:
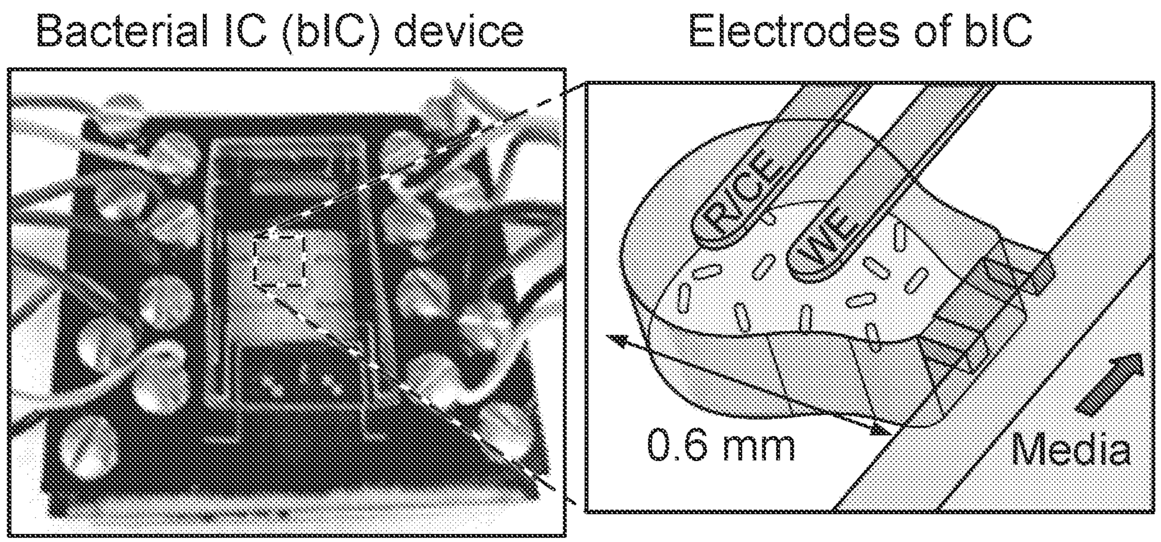
FIG. 11A is a schematic diagram of a micro-fluidic chip in a cellular circuit and a single microwell including the reference and working electrodes.

A challenge in synthetic biology is a minimally tracking gene expression without the need for fluorescent proteins and associated complex imaging equipment. Given recent efforts in the development of electrochemical platforms and the minimal nature of impedance measurement for circuit dynamics by directly connecting bacteria with electrodes, a miniature device to demonstrate the utility of the methods described herein for this purpose was developed. A fluidic chip with multiple milli-scale growth chambers, where each chamber contained electrodes, was fabricated. FIG. 11A is an image of the bacterial integrated circuit (bIC) device (left) and schematic diagram (right) showing the design of the growth chamber and adjoining gold electrodes. Each bIC integrates lithography-fabricated electrodes, including a reference/counter electrode (R/CE) and a WE electrode, on 0.6-mm-diameter traps where bacteria form 3D continuous cultures.

Figure 12A:
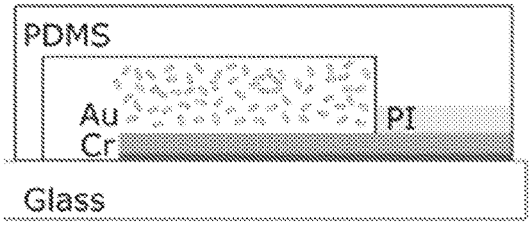
FIG. 12A is a schematic diagram showing electrical contacts of a cellular integrated circuit on a micro-fluidic chip.
Figure 12C:
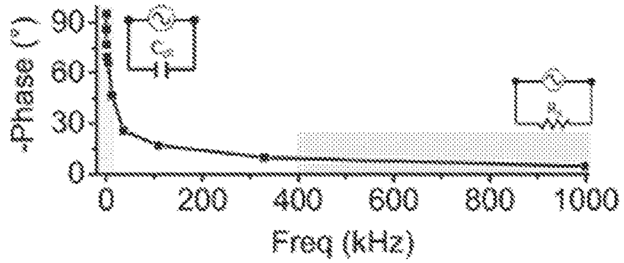
FIG. 12C is a line chart comparing electrical signal phase to frequency for a cellular integrated circuit.
Figure 12B:
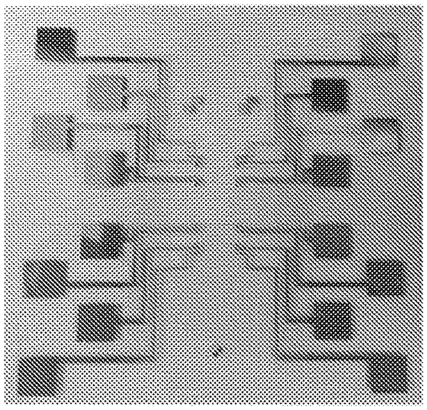
FIG. 12B is an image of a micro-fluidic chip including eight cellular integrated circuits.
Figure 12D:
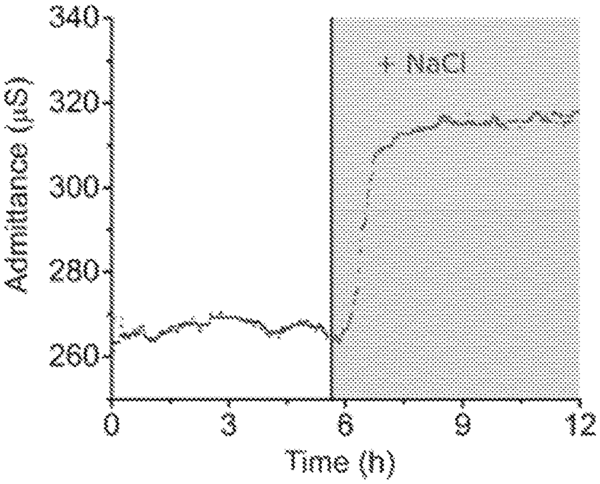
FIG. 12D is a line chart showing admittance as a function of time for a NaCl-sensing cellular integrated circuit.
Figure 12E:
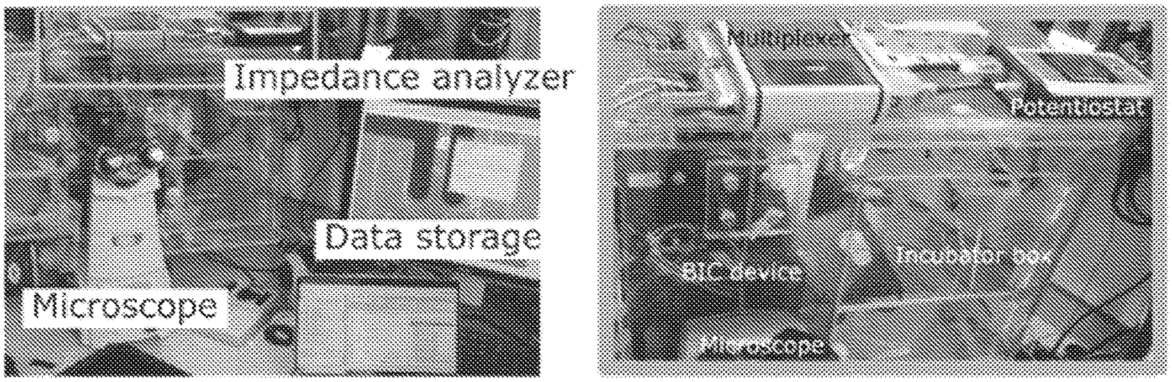
FIG. 12E is an image of a system for cellular integrated circuit measurements including a microscope and an impedance analyzer.

The electrodes were composed of conductive interlayers of chrome and gold, which made up the reference/counter and working electrodes, see FIGS. 12A, 12B, 12E. FIG. 12A is a schematic diagram showing the fabrication of electrodes on glass via sequential deposition of conductive chrome (Cr) and gold (Au) layers and a final spin of a polyimide insulator (PI) layer. FIG. 12B is an image of the lithography fabricated electrodes on glass.

Figure 11B:
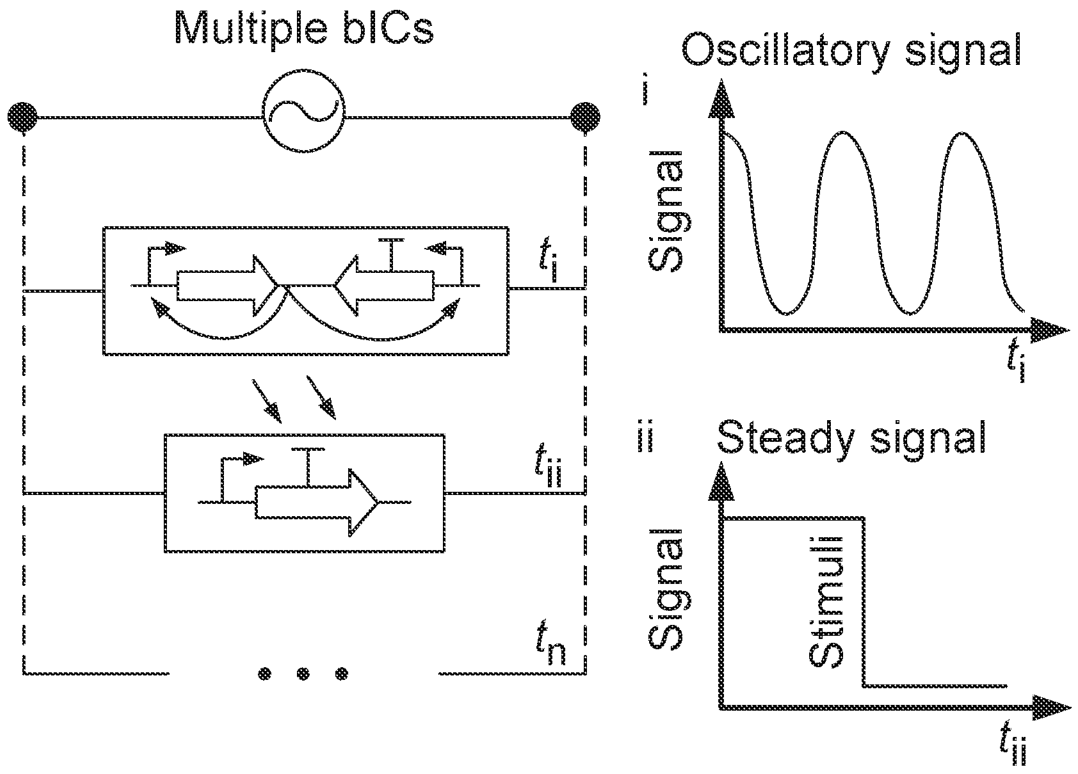
FIG. 11B is schematic diagram showing multiplexed genetic circuits.

Each of the electrode-containing growth chambers was seeded with engineered bacteria, which were referred to as bICs, since each one connects genetic circuit output to electrochemical measurement. Multiple bICs were connected in parallel to a single potentiostat and a multiplexing module, allowing for the measurement of multiple strains. FIG. 11B is a schematic illustration of the equivalent electrical circuit illustrating multiple parallel interconnecting bICs measured with a single potentiostat. The dynamics of each bIC were measured sequentially in time intervals (Δt). A device containing n unique bICs may output an oscillatory signal at $t_i$, a steady signal at $t_{ii}$, and other distinct signals up to tn.

Resistive effects were measured in the growth chambers of this device over a wide range of input frequencies, see FIG. 12C. FIG. 12C is a line chart comparing the signal phase (°) on the y-axis to frequency (kHz) on the x-axis in a bIC for LB media and corresponding equivalent circuits (inset) at different frequencies.

The electrodes detected changes in environmental ion concentration via admittance measurements, see FIG. 12D. FIG. 12D is a line chart comparing the admittance (μS) on the y-axis to time (h) on the x-axis showing the response of microfluidic electrodes using LB, induced with 100 μM NaCl (shadowed) using same procedure as with multiple bICs.

Figure 11C:
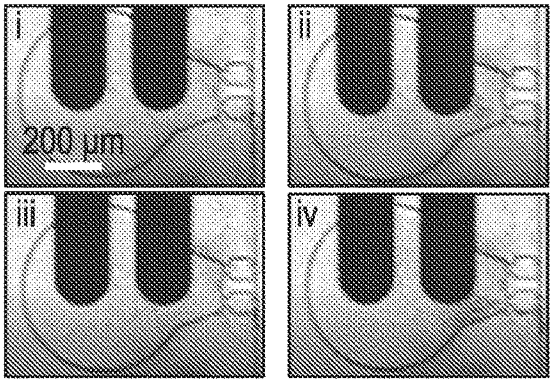
FIG. 11C is a set of four images of a microwell during exposure of a cellular population in the microwell to an inducer agent.
Figure 11D:
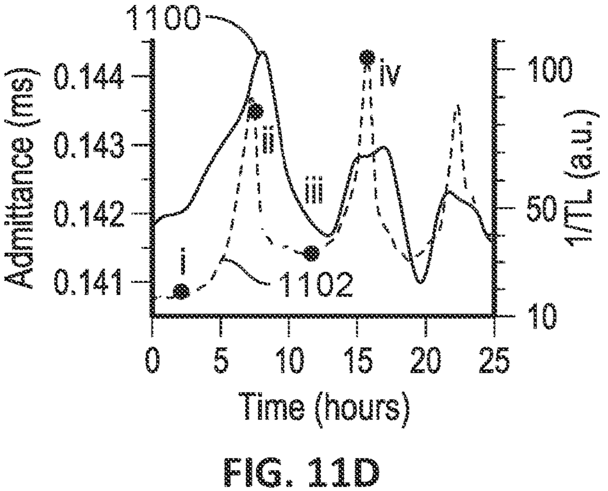
FIG. 11D is a three-axis line chart comparing turbidity and admittance as a function of time for the four images of FIG. 11C.

The bIC chip displayed the potential to detect gene circuit behavior via impedance detection of ions in solution. The capabilities of the electrochemical platform using the miniaturized device were characterized. The SLC strain was investigated first, using both impedance and transmitted light (TL) measurements to confirm that the impedimetric output corresponded to population dynamics. Bacterial growth oscillations were observed in both TL and admittance, showing that oscillatory impedance output could be achieved with this circuit as a bIC. FIG. 11C is an image of a bIC, containing the *Salmonella* SLC strain, taken using transmitted light (TL). The bacteria began at a low cell density (i) from which they reached the quorum threshold and lysed (ii and iii), and then repeated the process (iv). FIG. 11D is a three axis line chart comparing admittance (mS) on the left axis and inverse transmittance (a.u.) on the right axis to time (hours) on the x-axis. FIG. 11D shows profiles of admittance (1100) and inverse of the TL (1102) for the strain in FIG. 11C. FIG. 11D includes numerals i, ii, iii, and iv corresponding to the time points of the images of FIG. 11C.

Periodical lysis events were found every 7.6±1.2 hours for both admittance and turbidity signals. In comparison with the electrochemostat, the admittance values in this device were lower, likely due to the lower electrode surface area. The period discrepancy was related to the differences between approaches and culture sizes. The sensing capabilities of the device were also investigated using a bacterial cell population with a control gene capable of inducing lysis in the presence of arsenic. The bacterial population reached a steady state in both TL and admittance before induction with arsenic. Subsequent lysis resulted in the admittance sharply decreasing to another steady state within 1 hour.

Figure 11E:
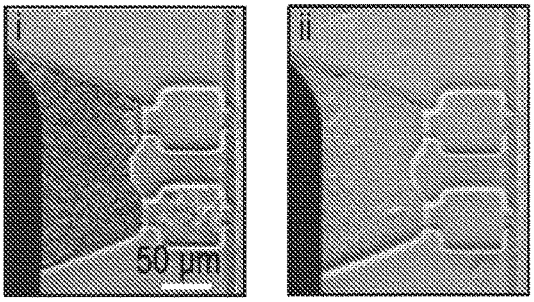
FIG. 11E is a set of two images of the microwell and chambers before and after exposure to an inducer agent corresponding to images (i) and (ii) of FIG. 11C.
Figure 11F:
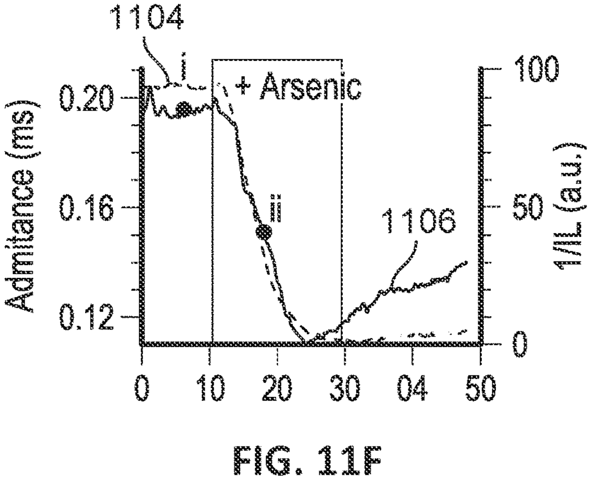
FIG. 11F is a three-axis line chart comparing turbidity and admittance as a function of time for the two images of FIG. 11E.

FIG. 11E includes images showing the response of the bIC with the arsenic-inducible cell population in *E. coli* MG1655 showing the steady growth state (i) and after 250-ppb arsenic induction (ii). FIG. 11F is a three axis line chart comparing admittance (mS) on the left axis and inverse transmittance (a.u.) on the right axis to time (hours) on the x-axis. FIG. 11F shows profiles of admittance (1104) and inverse of the TL (1106) for the strain in FIG. 11E.

The TL exhibited a slight drift after the lysis event, likely due to a small portion of the bacterial population exhibiting both growth and lysis in the presence of arsenic, but where the population was small enough not to be detected by electrochemical measurement. Reproducibility between traps indicated RSDs of 10.8 and 13.0% (n=4) for TL and admittance, respectively. These results demonstrate the functionality of the bIC device as a miniature platform for electrochemically measuring genetic circuit output. More generally, the electrochemical monitoring of engineered bacteria provides a label-free method for the real-time collection of expression data, in contrast to standard optical modalities.

Conventionally, assessment of gene circuit functionalities has been predominantly reliant on detection of specific fluorescent or colorimetric proteins. In contrast, the methods, systems, and devices described herein implement the direct interfacing of engineered microorganisms with microelectronics to provide a framework for a new class of hybrid biological electronic devices and biosensors where cellular "logic" informs electronic output. Engineered bacterial circuits can be interfaced with microelectronics with simple electrical measurement values detected. The increase of conductivity of the solution is generally due to energy metabolism or transportation of ions through the cell membrane, where uncharged or weakly charged substrates are transformed into highly charged smaller ions. Direct interfacing of electrodes with the cell culture represents a simplified format with which cell populations can be connected to an electrical output. As noted previously, redox active species were not introduced into the medium prior to measuring electrical signals, and the measured values of electrical parameters such as admittance, impedance, resistance, and conductance reflect changes in concentrations of metabolic products generated by the cell populations, rather than changes in concentrations of reduced or oxidized redox active species.

Consequently, the bacterial population dynamics were not affected by external inputs other than the target analytes of interest. In this sense, bacterial lysis, engineered or otherwise induced, functions as a general interface for electronics. As an alternative to conventional optics, electrical parameter measurement allows for exploring more complex nonoptically transparent materials and samples. Compared to other electrochemical approaches such as stripping voltammetry, genetic circuits can provide the selectivity expected from a biosensor by connecting genetic sensing elements naturally present in cells to impedimetric output via lysis. By connecting the bacterial sensing output directly to electrodes, isolation and preparation steps are not required to build a biochemical sensor. In addition, compared to common molecular-based biosensors, which use enzymes or antibodies, the proposed lysis triggering of bacteria enables dynamic sensing because cells can be grown in continuous environmental conditions. For example, the sensor responds in 40±10 min after triggering (FIG. 7C), an interval which is likely dependent on the translation of proteins.

Biofouling processes may increase the divergence between turbidity and admittance (FIG. 10B) over time. The population control and the interfacing of genetic lysis circuits with electronics provides an inherent anti-biofouling mechanism because of the continuous clearing of the chamber after certain periods of time or after certain triggering conditions.

Isolating the electrodes from the bacterial culture using permeable membranes or using microfluidic chambers that exclusively allow the supernatant to be measured can improve the performance of individual, and arrays of, bICs. Three-dimensional (3D) layering is possible with the use of electrodes compared to conventional imaging methods, as well as in vivo depth tissue measurements using implantable electronics for applications where bacteria reside in vivo.

The compartmentalization of bacterial colonies in the bIC facilitates high-throughput monitoring of large libraries. The methods, systems, and devices described herein are applicable to readily connect microelectronics with a variety of genetic circuits such as logic gates, switches, oscillators, sensors, and more sophisticated microbial communities, which permit construction of a variety of hybrid computational devices, where an array of bacterial colonies process external information through genetic circuitry, which is then transferred via impedance measurements (or measurements of another electrical parameter), to an electronic device for analysis.

Procedures

Engineered bacterial strains used in the methods, systems, and devices described herein can be generated using plasmids constructed by the circular polymerase extension, standard restriction digest/ligation, or Gibson assembly cloning methods. Attenuated *Salmonella enterica* subsp. *enterica* serovar *typhimurium*, SL1344 strain ELH1301, and *Escherichia coli* MG1655 were used as the bacterial hosts for transformation and electroporation of the experimental plasmids. For the IPTG-induced lysis experiments, we used the plasmid pE35GFP, which was provided by R. Young. This plasmid contains a lac promoter that transcribes gene E after IPTG induction, which causes lysis of the host. The arsenic-induced lysis experiments were performed with the As-lysis plasmid. This plasmid contains an arsenic-sensitive promoter driving the expression of its repressor (ArsR, from *E. coli* plasmid R773) and the lysis gene, E. The control with copper-sensitive (Cu-lysis) strain contains a copper-sensitive promoter driving the expression of its repressor (CueR, from *E. coli* plasmid) and the lysis gene, E. For the SLC, the strains designated MOD46A and MOD101 were used, and are described in Din et al., *Nature* 536(7614): 81-85 (2016), the entire contents of which are incorporated by reference herein.

Impedance characterization was performed using an electrode pairs fabricated from an inert gold material. All electrochemical measurements were performed with a commercial potentiostat (PalmSens4 with an impedance module, Enschede, Holland) at a 10-mV voltage amplitude and zero DC bias to avoid possible electrochemical reactions. Measurements were performed in the range of frequencies starting from 1 MHz to 1 Hz. Corresponding impedance versus frequency plots were analyzed using the Randles model as the electrical equivalent circuit in a non-Faradaic system. Under these conditions, the total impedance could be expressed by the medium resistance (Rs) and the double-layer capacitance (Cdl) in series. By treating the impedance as a vector, the total impedance is divided into real and imaginary parts.

Thus, when the phase is zero, the real impedance is the main component of the total impedance and can be represented as the medium resistance. Stripping voltammetry measurements (FIG. 7E) were performed using commercial screen-printed gold electrodes using Ag/AgCl as the reference electrode (C220AT, DropSens-Metrohm, Riverview, FL, USA) and a commercial potentiostat (PalmSens4, Enschede, Holland).

The arsenic and copper solutions were prepared in 0.2 M $HNO_3$ from standard solutions at 10 ppm (ERA Waters, Golden, CO, USA). Deposition of metals on the working electrode was performed at −0.6 V for 300 s. Square-wave voltammetry profiles were obtained between 0 to +0.3 V versus Ag/AgCl, at 25 Hz, 5 mVs−1, and 40 mV, applying a cleaning step at +0.3 V for 60 s between measurements.

Macroscale bacterial characterization was performed using an electrochemostat composed of a custom-built 3D printed housing where the electrochemical and turbidity detectors were enclosed (FIG. 8). This assembly was placed in a 37° C. incubator for experiments. The 3-ml bacterial culture, confined in an autoclavable beaker, is stirred at 700 rpm. Fresh LB media (containing 0.075% Tween-20; BD Difco, LB broth, Miller) was continuously supplied with a P625/10K. 143 peristaltic pump (Instech, Plymouth Meeting, PA, USA) at a typical flow rate of 25 μl/min. A removable lid held in place inlet and outlet tubings and the disposable screen-printed electrochemical sensor consisting of a 3-mm diameter gold working electrode and a 4-mm gold counter/reference electrode (C220AT, DropSens-Metrohm, Riverview, FL, USA). The lid also had an extra opening for aerobic conditions. A new electrode was used for each experiment and connected to a type B screen-printed electrode adapter (IO Rodeo, Pasadena, CA, USA) interfaced to the potentiostat. The optimal potential frequency for impedance measurement in these experiments was 100 kHz. Turbidity and impedance values were taken every 30 s and transmitted via USB to a PC.

Photolithography was used to pattern the multi-bICs on a 75 mm by 50 mm glass slide. Interconnected layers of Cr (20 nm)/Au (200 nm) were deposited (Denton Discovery 18 Sputter System) and chemically etched to form the eight pairs of electrodes. A second layer of polyimide (PI-2545, HD Microsystems, USA) as electrical insulation was coated to yield a 1.2-μm film. This top layer was etched by reactive ion etching (Plasmalab Oxford P80), exposing only the electrodes and connection pads. All the contact pads were aligned to a 3D-printed holder, which facilitated alignment with the microscope and connection using conductive screws interconnected to a flat ribbon cable attached to the MUX8-R2 multiplexer (FIG. 12E).

The module was controlled by the potentiostat that measured the eight electrodes with a 30-s delay between measurements. Optical and impedance measurements were taken every 4 and 5 min, respectively, for every bIC. A potential frequency of 1 MHz was used for the impedance measurements. Millifluidic devices were constructed from polydimethylsiloxane (Dow Corning, Sylgard 184), which was molded and baked on a silicon master with customized features.

A sinusoidal AC potential was applied to the system. The calculated impedance was determined from the ratio of the applied voltage and the measured current that flows through the system. The impedance spectra were obtained by sequential measurements for each single frequency. The impedance in aqueous solution was represented by an equivalent circuit consisting of two components, a double layer capacitor (Cdl) and bulk medium resistor (Rs) connected in series.

Cdl accounts for the effect of ionic species on the capacitance near the surface of an electrode. Rs represents the bulk resistance of the solution, accounting for the change in conductivity and charge transport across the bulk solution. There were three regions in the impedance spectrum shown in FIG. 4B. These were represented by two components in the equivalent circuit individually, and their combination. The double layer region dominated by Cdl was in the frequency range of 1 Hz to 5 Hz (left shaded area). The resistive region dominated by Rs was in the frequency range between 35 kHz to 100 kHz (right shaded area). The region dominated by both Cdl and Rs was in the frequency range of 5 Hz-35 kHz (not shaded).

The effect of the double layer capacitance was noticeable at phase angle values close to −90° as shown. In the high frequency range, resistive region, the phase angle values were close to 0° and the magnitude of the impedance was constant, as resistive impedance was independent of frequency. At the high frequency interval (>35 kHz) there was no substantial contribution to the double layer capacitance. Thus, the most important contribution to the total impedance of the system at high frequencies was related to the resistance of the medium, which was independent from the frequency. This region is defined as the resistive region, in which ion conduction in the medium was dominant (FIG. 4B, left shaded region). The changes in the double layer of the electrode, and the changes in the medium during bacterial growth were detected by measuring impedance at different frequencies, as described herein, to explore microbiological detection at these frequencies.

Bacterial cultures and media were studied using 50 μL of sample solution as shown in FIG. 4A through FIG. 4E. The different solutions characterized included fresh LB media ((BD Difco, LB broth, Miller) containing 0.075% Tween-20), concentrated bacteria mixed with fresh LB media, supernatant from a MG1655 *E. coli* culture grown to an optical density at 600 nm (OD600) of 0.61, and a heat-killed MG1655 culture (10 minutes at 90° C.), at an OD600 of 0.18. Redox inactivity of the bacteria and LB on the screen printed gold electrodes was characterized using cyclic voltammetry (CV) between −0.5 to +1.0 V with 10 mV potential step at a scan rate of 50 mV/s. CV only showed the oxidation of water to oxygen at high potentials and the reduction to hydrogen at low potentials (FIG. 4A).

The synchronized lysis circuit (SLC) cell populations were engineered using two plasmids, an activator (KAN, ColE1), and a lysis plasmid built by taking the lysis gene, E, from the ePop plasmid via PCR and cloning it into a vector (CM, p15A) under the control of the luxI promoter. The hlyE gene was obtained via PCR from the genomic DNA of MG1655. The SLC strains were cultured in LB media with 50 μg mL-1 and 34 μg mL-1 of kanamycin (KAN) and chloramphenicol (CM) respectively, along with 0.2% glucose, in a 37° C. incubator. The stimuli-dependent strains were cultured in LB media with 50 μg mL-1 KAN along with 0.2% glucose, in a 37° C. incubator.

The customized turbidity printed circuit board included an OPT101 monolithic photodiode with on-chip transimpedance amplifier BPW34 infrared/visible silicon detector and a 950 nm infrared LED emitter (RadioShack, Fort Worth, TX, US). A 555 timer along with a modulator/demodulator (AD630) enable filtered signal. Turbidity values were transmitted via USB to a PC in which sampling time and gain were controlled. Detection was performed at 90° versus the LED every 30 s. (FIG. 8B). Calibration of the turbidity sensor was performed for a growth curve of a MG1655 *E. coli* culture in LB media simultaneously measuring with the customized turbidity board and a spectrometer at 600 nm every 15 min (FIG. 8C).

Milli-fluidic devices were constructed from polydimethylsiloxane (PDMS) (Dow Corning, Sylgard 184) which was molded and baked on a silicon master with customized features. The Si wafer formed by cross-linked photoresist consisted of three layers of 4, 30 and 100 μm height, respectively. Individual devices consisted of 10×9 array bacterial traps of 0.6 mm diameter and 30 μm height connected via two 4 μm height channels to a main channel, which provided fresh media to the individual bacterial cultures. Devices were cut out of the baked PDMS and holes were punched in the devices to allow the connection of fluid lines.

When electrodes were used for analysis, a conventional mask aligner was used for alignment. The devices were then kept for 2 h in a 37° C. incubator for complete bonding. The devices were placed on a microscope 3D printed stage for imaging and connected to the impedance module. Fluid lines were connected to the device from two syringes, one supplying the medium, and another acting as waste reservoir. Hydrostatic pressure driven flow was controlled by maintaining a 15-inch relative height difference between the inlet and outlet syringes. In these microfluidic experiments, 0.075% Tween-20 was added to the media and cell suspension fluid to prevent cells from adhering to PDMS channels, electrodes, tubing or ports of the device.

For the electrochemostat experiments, 60 μL of overnight culture at an OD600 of 0.6 was added to 3 mL of LB supplemented with 0.075% Tween-20 and the appropriate antibiotics. The surfactant addition prevented bacteria from adhering to glass, electrodes and tubing. Bacterial loading on the bIC device was performed by an automatic echo acoustic liquid handler (Labcyte Inc., San Jose, CA, US). The robotic transducer transferred 2.5 nL of overnight culture at and OD600 of 0.8 to each trap. Cells were transferred 10 minutes after exposing glass and PDMS to oxygen plasma for optimal cell loading.

A Nikon Eclipse TI epifluorescent microscope was used for phase-contrast based imaging. For the acquisition of images, a CoolSNAP HQ2 CCD camera from Photometrics was used. The microscope and acquisition were controlled by Nikon Elements software. A plexiglass incubation chamber connected to a heating unit, which encompassed a wide area around the stage, was used to maintain the temperature of the microfluidic device at 37° C. Phase-contrast images were taken at 10× magnification at 10-50 ms exposure times. Fluorescent imaging at 10× was performed at 200 ms for GFP, 30% setting on the Lumencor SOLA light source. Images were taken every 4 minutes for the course of a typical experiment.

For the electrochemostat, data from PSTrace software was used to plot the reciprocal of the total impedance value overtime. Data for turbidity and impedance was smoothed with 5 points of window using a polynomial order 2 and a Savitzky-Golay method, to mitigate temperature fluctuations in the incubator. For the microfluidic device, microscope images were treated with Image J. The reciprocal of transmitted light intensity profiles were obtained by analyzing frames in Image J from the phase/contrast channel and plotting the mean pixel intensity over time. The reciprocal of that plot is presented in FIG. 11D and FIG. 11F. Electrochemical plots were obtained from PSTrace software and admittance was calculated from the total value of impedance.

OTHER EMBODIMENTS

A number of embodiments have been described by way of example above. However, none of the embodiments described herein should be construed to limit the scope of the following claims.

What is claimed is:

1. A method of measuring a cell population, the method comprising:

culturing a cell population in a growth medium, wherein the cell population comprises a cell strain comprising a control gene and a promoter sequence, and wherein the cell population generates a metabolite in the growth medium during growth of cells of the cell population;

positioning first and second electrodes in contact with the growth medium, wherein the first and second electrodes are connected to different terminals of an electrical source;

applying an electrical signal between the first and second electrodes;

measuring an electrical parameter of the growth medium as a function of time;

determining information about a concentration of the metabolite in the growth medium as a function of time based upon the measured electrical parameter; and determining information about the cell population based upon the concentration of the metabolite in the growth medium.

2. The method of claim 1, wherein the electrical parameter comprises at least one member selected from the group consisting of an electrical admittance of the growth medium, an electrical impedance of the growth medium, a conductance of the growth medium, and a resistance of the growth medium.

3. The method of claim 1, wherein the cell population comprises at least one member selected from the group consisting of one or more different bacterial strains and one or more different yeast strains.

4. The method of claim 1, wherein the cell population comprises at least one member selected from the group consisting of one or more different mammalian cell strains and one or more different insect cell strains.

5. The method of claim 1, wherein the growth medium comprises a hydrogel.

6. The method of claim 1, wherein the control gene is activated by at least one mechanism selected from the group consisting of: an external inducer; a self-activated inducer; and a combination of an external inducer and a self-activated inducer.

7. The method of claim 6, wherein the external inducer is selected from the group consisting of: exposure to optical radiation, a change in temperature, a chemical reagent, a viral agent, and combinations thereof.

8. The method of claim 1, wherein measuring the electrical parameter comprises measuring at least member selected from the group consisting of: a cyclic voltammetry signal for the growth medium; a potentiometry signal for the growth medium; an electrical conductivity of the growth medium; a phase difference between electrical signals measured for the growth medium; and combinations thereof.

9. The method of claim 1, wherein the control gene is a single-gene lysis gene, a multi-gene lysis gene, one or more TA module genes, one or more toxin genes, or one or more peptide toxin gene.

10. The method of claim 1, wherein the control gene is activated by a target analyte.

11. The method of claim 10, wherein the target analyte comprises at least one member selected from the group consisting of a chemical species and a biochemical molecule, the method further comprising determining a relative concentration of the target analyte in the growth medium as a function of time based on the information about the cell population.

12. The method of claim 1, comprising measuring the electrical parameter of the growth medium without introducing a redox active species into the growth medium.

13. A system for monitoring a cell population, the system comprising:

a reservoir configured to contain a cell population, wherein the cell population comprises a cell strain comprising a control gene and a promoter sequence;

a fluidic conduit connected to the reservoir;

a fluid source connected to the fluidic conduit and configured to supply a growth medium to the reservoir through the fluidic conduit;

electrodes configured to contact the growth medium in the reservoir;

an electrical source connected to the electrodes and configured to apply an electrical signal to the growth medium;

a detector configured to measure an electrical parameter of the growth medium as a function of time; and an electronic processor connected to the detector and configured to receive measurements of the electrical parameter, and to determine information about the cell population based on the measured electrical parameter.

14. A device for detecting a target analyte, the device comprising:

a substrate comprising a reservoir configured to contain a cell population, wherein:

the cell population comprises a cell strain comprising a control gene and a promoter sequence;

the promoter sequence is configured to bind a target analyte and, upon binding the target analyte, to activate the control gene to be expressed; and the control gene is configured to modulate growth of the cell population;

an inlet formed on or in the substrate and connected to the reservoir;

a fluid delivery mechanism connected to the inlet and configured to introduce the target analyte into the reservoir;

electrodes configured to contact a medium supporting the cell population in the reservoir;

an electrical source connected to the electrodes and configured to apply an electrical signal to the medium;

a detector configured to measure an electrical parameter of the medium arising from a change in a concentration of a metabolite generated by the cell population following introduction of the target analyte; and an electronic processor connected to the detector and configured to receive measurements of the electrical parameter, and to identify the target analyte based on the measured change in the electrical parameter.

15. The device of claim 14, further comprising:

maintaining the cell population in a chamber, and flowing the medium through the chamber; and measuring the electrical parameter in different portions of the flowing medium as a function of time.

16. The device of claim 14, wherein measuring the electrical parameter comprises measuring at least member selected from the group consisting of: a cyclic voltammetry signal for the medium; a potentiometry signal for the medium; an electrical conductivity of the medium; a phase difference between electrical signals measured for the medium; and combinations thereof.

17. The device of claim 14, wherein the control gene is activated by a target analyte that comprises at least one member selected from the group consisting of a chemical species and a biochemical molecule, and wherein the electronic processor is configured to determine a relative concentration of the target analyte in the medium as a function of time based on information about the cell population.

18. The device of claim 17, wherein the information about the cell population comprises information about a relative concentration of at least one metabolite generated by the cell population.

19. The device of claim 14, comprising measuring the electrical parameter of the medium without introducing a redox active species into the medium.

* * * * *